United States Patent
Chang et al.

(10) Patent No.: US 11,140,406 B2
(45) Date of Patent: Oct. 5, 2021

(54) SIGNALLING FOR MERGE MODE WITH MOTION VECTOR DIFFERENCES IN VIDEO CODING

(71) Applicant: QUALCOMM Incorporated, San Diego, CA (US)

(72) Inventors: Yao-Jen Chang, San Diego, CA (US); Wei-Jung Chien, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/793,807

(22) Filed: Feb. 18, 2020

(65) Prior Publication Data

US 2020/0267406 A1   Aug. 20, 2020

Related U.S. Application Data

(60) Provisional application No. 62/808,215, filed on Feb. 20, 2019.

(51) Int. Cl.
*H04N 19/513* (2014.01)
*H04N 19/70* (2014.01)

(52) U.S. Cl.
CPC .......... *H04N 19/513* (2014.11); *H04N 19/70* (2014.11)

(58) Field of Classification Search
None
See application file for complete search history.

(56) References Cited

U.S. PATENT DOCUMENTS

| 2013/0114717 A1* | 5/2013 | Zheng | H04N 19/52 375/240.14 |
| 2013/0202037 A1* | 8/2013 | Wang | H04N 19/176 375/240.15 |
| 2013/0202038 A1* | 8/2013 | Seregin | H04N 19/52 375/240.15 |
| 2014/0169475 A1* | 6/2014 | Zhang | H04N 19/513 375/240.16 |

(Continued)

OTHER PUBLICATIONS

Bross B., et al., "Versatile Video Coding (Draft 3)", Joint Video Experts Team (JVET) of ITU-T SG 16 WP 3 and ISO/IEC JTC 1/SC 29/WG 11, 12th Meeting: Macao, CN, JVET-L1001-v9, Oct. 3-12, 2018, 235 pp.

(Continued)

Primary Examiner — Talha M Nawaz
(74) Attorney, Agent, or Firm — Qualcomm Incorporated

(57) ABSTRACT

A video decoder configured to generate a first merge candidate list for a first block; determine that the first block is coded in a merge mode with motion vector differences; in response to determining that a maximum number of entries for the first merge candidate list is equal to 1, infer a value of a first instance of a flag to be equal to a first value, wherein the first value for the flag indicates that the first block is to be decoded using a first entry in the first merge candidate list; receive first motion vector difference information; determine first motion information for predicting the first block based on candidate motion information included in the first entry of the first merge candidate list and the first motion vector difference information; and decode the first block using the first motion information.

33 Claims, 14 Drawing Sheets

(56) References Cited

U.S. PATENT DOCUMENTS

2015/0078450 A1* 3/2015 Chen ............... H04N 19/52
                                                    375/240.16
2017/0127082 A1* 5/2017 Chen ............... H04N 19/176

OTHER PUBLICATIONS

Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-v5, 287 pages.

Bross B., et al., "Versatile Video Coding (Draft 8)", Joint Video Experts Team (JVET) of ITU-T SG 16 WP 3 and ISO/IEC JTC 1/SC 29/WG 11,17th Meeting: Brussels, BE, Jan. 7-17, 2020, Document: JVET-Q2001-v1, 495 Pages.

Chen J., et al., "Algorithm description for Versatile Video Coding and Test Model 1 (VTM 1)", Joint Video Exploration Team (JVET) of ITU-T SG 16 WP 3 and ISO/IEC JTC 1/SC 29/WG 11, 10th Meeting: San Diego, US, Apr. 10-20, 2018, Jun. 16, 2018, JVET-J1002-v2, 10 pages, XP030198635, http://phenix.int-evry.fr/jvet/doc_end_user/documents/10_SanDiego/wg11/JVET-J1002-v2.zip.

Chen J., et al., "Algorithm description for Versatile Video Coding and Test Model 3 (VTM 3)", Joint Video Experts Team (JVET) of ITU-T SG 16 WP 3 and ISO/IEC JTC 1/SC 29/WG 11, JVET-L1002-v2, 12th Meeting: Macao, CN, Oct. 3-12, 2018, Doc: JVET-L1002, 48 pages.

Chen J., et al., "Algorithm Description for Versatile Video Coding and Test Model 4 (VTM 4)", Joint Video Experts Team (JVET) of ITU-T SG 16 WP 3 and ISO/IEC JTC 1/SC 29/WG 11, JVET-M1002-V2, 13th Meeting: Marrakech, MA, Jan. 9-18, 2019, pp. 1-63.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/ ,, No. JVET-A1001 Feb. 24, 2016 (Feb. 24, 2016), XP030150000, 27 pages.

Chen J., et al., "Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2.

Ergen S., "ZigBee/IEEE 802.15.4 Summary", Sep. 10, 2004, 37 Pages.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

"Information technology—Dynamic Adaptive Streaming over HTTP {Dash)—Part 1: Media Presentation Description and Segment Formats," ISO/IEC 23009-1, International Standard, Draft third edition, Jan. 9, 2017, 216 pp.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Ohm J-R., et al., "MPEG-4 Advanced Video Coding", MPEG Doc#: N7314, Jul. 2005, 11 Pages.

Bossen F., et al., "JVET Common Test Conditions and Software Reference Configurations for SDR video", Joint Video Experts Team (JVET) of ITU-T SG 16 WP 3 and ISO/IEC JTC 1/SC 29/WG 11, Document: JVET-M1010-V1, 13th Meeting: Marrakech, MA, Jan. 9-18, 2019, pp. 1-6.

R-L Liao (Panasonic), et al., "CE10.3.1.b: Triangular Prediction Unit Mode", 12. JVET Meeting, Oct. 3, 2018-Oct. 12, 2018, Macao, (The Joint Video Exploration Team of ISO/IEC JTC 1/SC 29/WG 11 and ITU-T SG.16), No. JVET-L0124-V2, Nov. 1, 2018 (Nov. 1, 2018), XP030198593, 8 Pages Retrieved from the Internet: URL: http://phenix.int-evry.fr/jvet/doc_end_user/documents/12_Macao/wg11/JVET-L0124-v6.zip JVET-L0124-v2.doc [retrieved on Nov. 1, 2018], the whole document.

Solovyev T., et al.,"Non-CE4: Simplifications for Triangular Prediction Mode", JVET-M0286-v2, Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-7.

Zhou M, "CE13: Test results on maxNumMergeCand signaling and simplification of merge MVP list pruning process", Joint Collaborative Team on Video Coding (JCT-VC) of ITU-T SG16 WP3 and ISO/IEC JTC1/SC29/WG11, 7th Meeting: Geneva, CH, Nov. 19-30, 2011, Document: JCTVC-G091, M21639, pp. 1-16.

Chang Y-J (Qualcomm), et al., "Non-CE4: On MMVD Signaling," 14. JVET Meeting, Mar. 19, 2019-Mar. 27, 2019, Geneva, (The Joint Video Exploration Team of ISO/IEC JTC1/SC29/WG11 and ITU-TSG.16), No. JVET-N0448, Mar. 21, 2019 (Mar. 21, 2019), XP030204270, 10 Pages, Retrieved from the Internet: URL: http://phenix.int-evry.fr/jvet/doc_end_user/documents/14_Geneva/wg11/JVET-N0448-v4.zip JVET-N0448-v2.docx, [retrieved on Mar. 21, 2019], Section 2.

International Search Report and Written Opinion—PCT/US2020/018781—ISAEPO—dated May 13, 2020 15 Pages.

Li (Tencent) G, et al., "CE4-related: Fix of MMVD Signalling," 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0380, Mar. 13, 2019 (Mar. 13, 2019), XP030203016, 3 pages, Retrieved from the Internet: URL: http://phenix.int-evry.fr/jvet/doc_end_user/documents/14_Geneva/wg11/JVET-N0380-v1.zip JVET-N0380-MMVD-Signalling.docx, [retrieved on Mar. 13, 2019], abstract, Sections 2 and 4.

* cited by examiner

SIGNALLING FOR MERGE MODE WITH MOTION VECTOR DIFFERENCES IN VIDEO CODING

This application claims the benefit of U.S. Provisional Patent Application 62/808,215, filed 20 Feb. 2019, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

This disclosure describes techniques related to improved syntax for use with merge mode with motion vector difference (MVD). As will be explained in more detail below, the techniques of this disclosure may reduce the bit overhead associated with merge mode with MVD by, in some coding scenarios, inferring a value of the flag indicating which of the two candidates is to be used. Inferring a value for the flag without having to a signal any bits may result in improved rate distortion tradeoffs when coding video data in merge mode with MVD.

According to one example, a method of decoding video data, the method includes generating a first merge candidate list for a first block; determining that the first block is coded in a merge mode with motion vector differences; in response to determining that a maximum number of entries for the first merge candidate list is equal to 1, inferring a value of a first instance of a flag to be equal to a first value, wherein the first value for the flag indicates that the first block is to be decoded using a first entry in the first merge candidate list; receiving first motion vector difference information; determining first motion information for predicting the first block based on candidate motion information included in the first entry of the first merge candidate list and the first motion vector difference information; and decoding the first block using the first motion information.

According to another example, a method of encoding video data includes generating a first merge candidate list for a first block; determining that the first block is coded in a merge mode with motion vector differences; determining first motion information for predicting the first block; determining first motion vector difference information, wherein the first motion vector difference information represents a difference between the first motion information for predicting the first block and candidate motion information included in a first entry of the first merge candidate list; in response to determining that a maximum number of entries for the first merge candidate list is equal to 1, refraining from including, in a bitstream of encoded video data, a flag, wherein a first value for the flag indicates that the first block is to be decoded using a first entry in the first merge candidate list and a second value for the flag indicates that the first block is to be decoded using a second entry in the first merge candidate list; generating, for inclusion in the bitstream of encoded video data, the first motion vector difference information; and outputting the bitstream of encoded video data.

According to another example, a device for decoding video data includes a memory configured to store video data and one or more processors implemented in circuitry and configured to: generate a first merge candidate list for a first block; determine that the first block is coded in a merge mode with motion vector differences; in response to determining that a maximum number of entries for the first merge candidate list is equal to 1, infer a value of a first instance of a flag to be equal to a first value, wherein the first value for the flag indicates that the first block is to be decoded using a first entry in the first merge candidate list; receive first motion vector difference information; determine first motion information for predicting the first block based on candidate motion information included in the first entry of the first merge candidate list and the first motion vector difference information; and decode the first block using the first motion information.

According to another example, a device for encoding video data includes a memory configured to store video data and one or more processors implemented in circuitry and configured to: generate a first merge candidate list for a first block; determine that the first block is coded in a merge mode with motion vector differences; determine first motion information for predicting the first block; determine first motion vector difference information, wherein the first motion vector difference information represents a difference between the first motion information for predicting the first block and candidate motion information included in a first entry of the first merge candidate list; in response to determining that a maximum number of entries for the first merge candidate list is equal to 1, refrain from including, in a bitstream of encoded video data, a flag, wherein a first value for the flag indicates that the first block is to be decoded using a first entry in the first merge candidate list and a second value for the flag indicates that the first block is to be decoded using a second entry in the first merge candidate list; generate, for inclusion in the bitstream of encoded video data, the first motion vector difference information; and output the bitstream of encoded video data.

According to another example, an apparatus for decoding video data, the apparatus includes means for generating a first merge candidate list for a first block; means for determining that the first block is coded in a merge mode with motion vector differences; means for inferring a value of a first instance of a flag to be equal to a first value in response to determining that a maximum number of entries for the first merge candidate list is equal to 1, wherein the first value for the flag indicates that the first block is to be decoded using a first entry in the first merge candidate list; means for receiving first motion vector difference information; means for determining first motion information for predicting the first block based on candidate motion information included in the first entry of the first merge candidate list and the first motion vector difference information; and means for decoding the first block using the first motion information.

According to another example, an apparatus for encoding video data includes means for generating a first merge candidate list for a first block; means for determining that the first block is coded in a merge mode with motion vector differences; means for determining first motion information for predicting the first block; means for determining first motion vector difference information, wherein the first motion vector difference information represents a difference between the first motion information for predicting the first block and candidate motion information included in a first entry of the first merge candidate list; means for in response to determining that a maximum number of entries for the first merge candidate list is equal to 1, refraining from including, in a bitstream of encoded video data, a flag, wherein a first value for the flag indicates that the first block is to be decoded using a first entry in the first merge candidate list and a second value for the flag indicates that the first block is to be decoded using a second entry in the first merge candidate list; means for generating, for inclusion in the bitstream of encoded video data, the first motion vector difference information; and means for outputting the bitstream of encoded video data.

According to another example, a computer-readable storage medium stores instructions that when executed by one or more processors cause the one or more processors to: generate a first merge candidate list for a first block; determine that the first block is coded in a merge mode with motion vector differences; in response to determining that a maximum number of entries for the first merge candidate list is equal to 1, infer a value of a first instance of a flag to be equal to a first value, wherein the first value for the flag indicates that the first block is to be decoded using a first entry in the first merge candidate list; receive first motion vector difference information; determine first motion information for predicting the first block based on candidate motion information included in the first entry of the first merge candidate list and the first motion vector difference information; and decode the first block using the first motion information.

According to another example, a computer-readable storage medium stores instructions that when executed by one or more processors cause the one or more processors to generate a first merge candidate list for a first block; determine that the first block is coded in a merge mode with motion vector differences; determine first motion information for predicting the first block; determine first motion vector difference information, wherein the first motion vector difference information represents a difference between the first motion information for predicting the first block and candidate motion information included in a first entry of the first merge candidate list; in response to determining that a maximum number of entries for the first merge candidate list is equal to 1, refrain from including, in a bitstream of encoded video data, a flag, wherein a first value for the flag indicates that the first block is to be decoded using a first entry in the first merge candidate list and a second value for the flag indicates that the first block is to be decoded using a second entry in the first merge candidate list; generate, for inclusion in the bitstream of encoded video data, the first motion vector difference information; and output the bitstream of encoded video data.

The details of one or more examples are set forth in the accompanying drawings and the description below. Other features, objects, and advantages will be apparent from the description, drawings, and claims.

DETAILED DESCRIPTION

Figure 1:
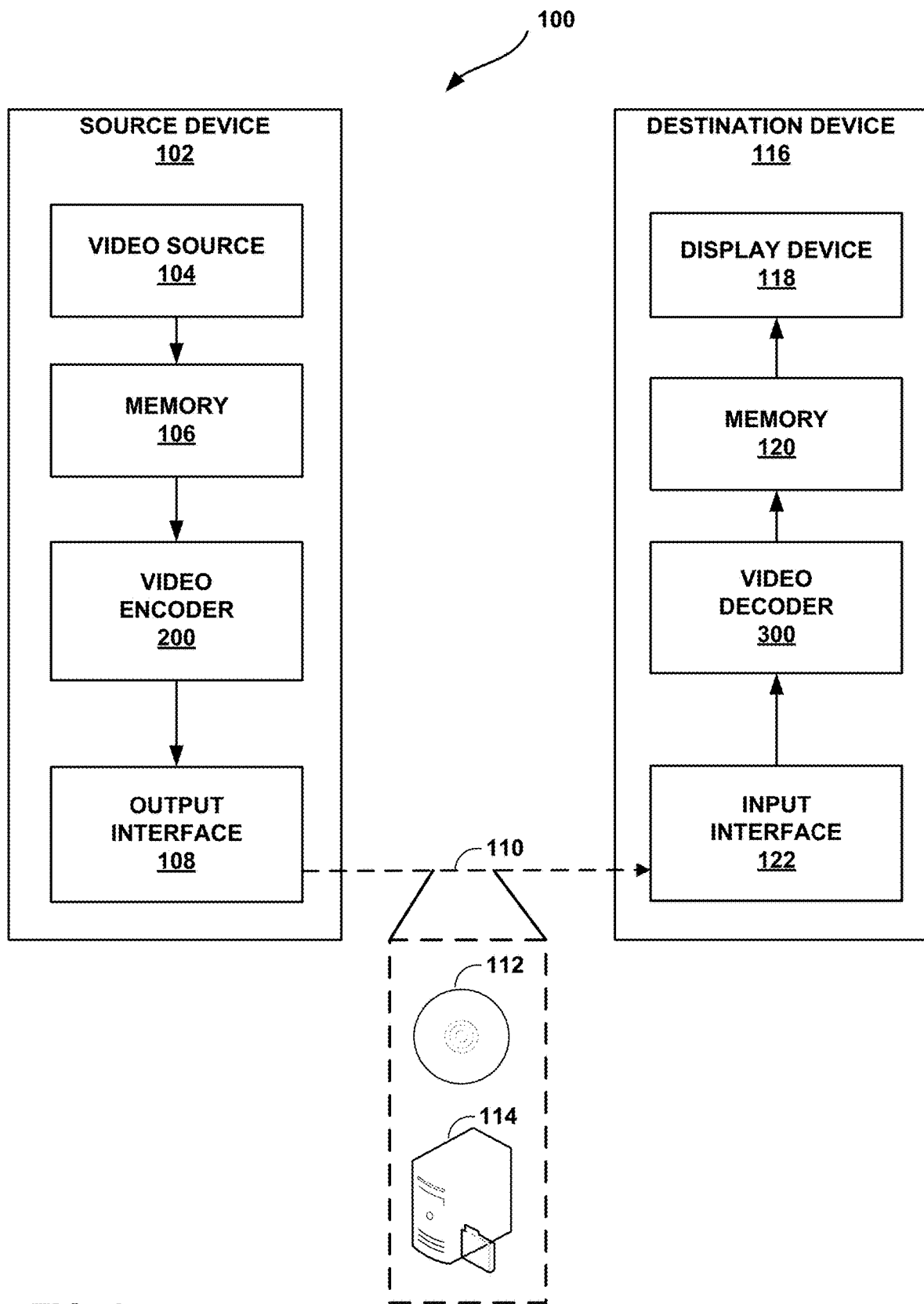
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder may sometimes transform and quantizes the residual data and signal the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

As will be described in more detail below, when coding a block of video data using inter prediction, a video encoder and video decoder may be configured to code the block in various modes. One such mode is merge mode. In merge mode, a video encoder and video decoder are configured to generate a list of merge candidates, where each merge candidate in the list includes motion information for predicting a block. The motion information may, for example, include one or more motion vectors and one or more reference picture identifies.

By implementing the same list generation process and only using available information from already coded blocks, a video encoder and video decoder can be configured to generate the same lists with the same merge candidates in the same order. Thus, for a video encoder to signal motion information in merge mode, the video encoder can include in the encoded bitstream an index identifying one of the merge candidates. As the video decoder has constructed the same list as the video encoder, the video decoder can determine the motion information associated with the merge candidate associated with the received index. In merge mode, the video decoder determines a predictive block based on the motion information associated with the merge candidate associated with the received index.

Merge mode with motion vector differences (MVD) is generally the same as merge mode, but in merge mode with MVD, the video encoder signals in the bitstream an MVD value that modifies the motion vector. Thus, in merge mode with MVD, instead of determining a predictive block using the motion vector of the identified merge candidate, a video decoder may add the MVD value to the motion vector of the identified merge candidate to determine a new motion vector and determine the predictive block using the new motion vector. While requiring more bits to signal the MVD, the new motion vector obtained by adding the MVD is typically more accurate than a typical merge motion vector, thus allowing for less distortion in the decoded video data. For both merge mode and merge mode with MVD, the video encoder and video decoder perform the same merge candidate list construction process, but in some examples of merge mode with MVD, only the first two candidates in a candidate list are used. Thus, for blocks coded in merge mode with MVD, the video encoder can signal to the video decoder a flag indicating which of the two candidates is to be used.

This disclosure describes techniques related to improved syntax for use with merge mode with MVD. As will be explained in more detail below, the techniques of this disclosure may reduce the bit overhead associated with merge mode with MVD (MMVD) by, in some coding scenarios, inferring a value of the flag indicating which of the two candidates is to be used. Inferring a value for the flag without having to a signal any bits may result in improved rate distortion tradeoffs when coding video data in merge mode with MVD. In this context, inferring a value for the flag refers to determining, by a video decoder, a value for the flag that can be used for decoding without explicitly signaling, i.e., without actually receiving an instance of the flag in the bitstream of encoded video data.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may each be any of a wide range of devices, including a desktop computer, notebook (i.e., laptop) computer, tablet computer, set-top box, telephone handset such as a smartphone, television, camera, display device, digital media player, video gaming console, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for MMVD described herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for MMVD described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). An early draft of the VVC is available in the document JVET-J1001 "Versatile Video Coding (Draft 1)" and its algorithm description is available in the document JVET-J1002 "Algorithm description for Versatile Video Coding and Test Model 1 (VTM 1)." Another early draft of the VVC is available in the document JVET-L1001 "Versatile Video Coding (Draft 3)" and its algorithm description is available in the document JVET-L1002 "Algorithm description for Versatile Video Coding and Test Model 3 (VTM 3)." Another early draft of the VVC is available in the document JVET-M1001 "Versatile Video Coding (Draft 4)" and its algorithm description is available in the document JVET-M1002 "Algorithm description for Versatile Video Coding and Test Model 4 (VTM 4)." A more recent draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, 17$^{th}$ Meeting: Brussels, BE, 7-17 Jan. 2020, JVET-Q2001-vA (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs and partitioning of each CTU according to a corresponding partition structure, such as a QTBT structure, to define CUs of the CTU.

The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may generate a merge candidate list for a block that is coded in an MMVD mode. In response to determining that a maximum number of entries for the merge candidate list is equal to 1, video encoder 200 may refrain from signaling a value for a flag that indicates which entry in the merge candidate list is to be used as the basis of motion information for the MMVD mode, and thus, rather than receiving the flag in the bitstream, video decoder 300 may infer that a value for that flag is equal to a first value indicating that the block is to be decoded using a first entry in the merge candidate list. Inferring a value for the flag without having to a signal any bits may reduce signaling overhead, which in turn may result in improved rate distortion tradeoffs when coding video data in MMVD.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
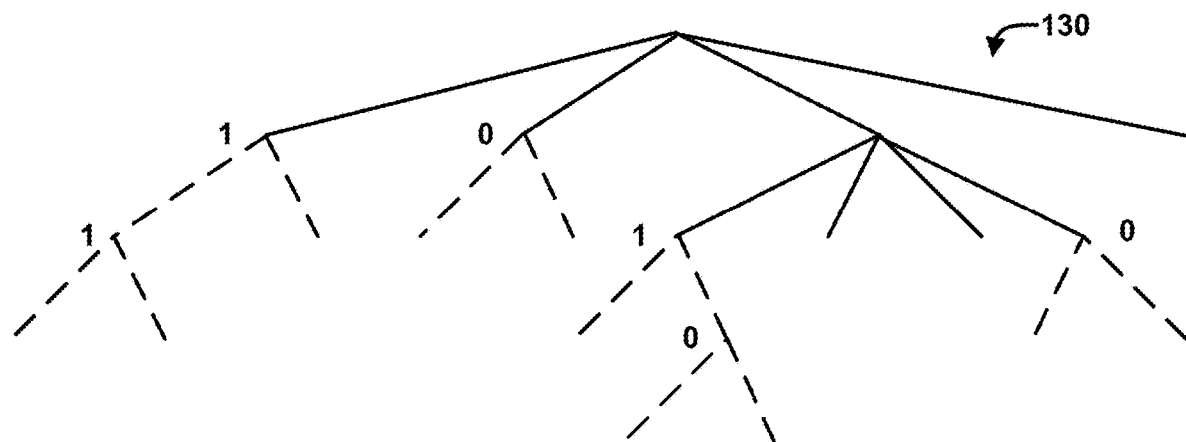
FIGS. 2A and 2B are conceptual diagrams illustrating an example quadtree binary tree (QTBT) structure, and a corresponding coding tree unit (CTU).
Figure 2B:
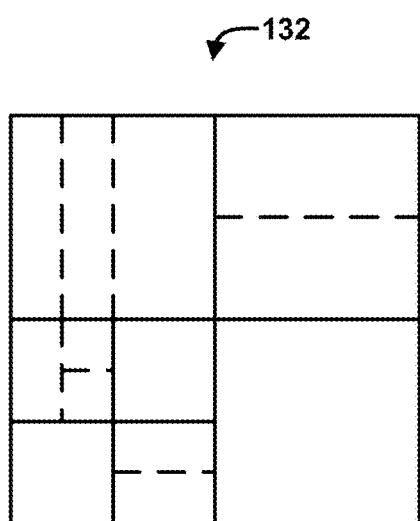

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

Video encoder 200 and video decoder 300 may be configured to code blocks of video data using extended merge prediction. When coding a block in merge mode, both video encoder 200 and video decoder 300 are configured to construct the same list of merge candidates based on already known information, such as the modes used for already decoded blocks. In this context, already known information refers to information that is obtainable based on already encoded or decoded video data. In this context, being the same means both lists have the same entries and the same order for entries. As both video encoder 200 and video decoder 300 construct the same lists, a candidate from the list can be signaled from video encoder 200 to video decoder 300 by signaling an index corresponding to the selected candidate in the list.

Video encoder 200 and video decoder 300 can construct a merge candidate list by, for example, including the following five types of candidates in order: (1) a spatial motion vector predictor from spatial neighbor CUs; (2) a temporal MVP from collocated CUs; (3) a history-based MVP from a first in, first out (FIFO) table; (4) a pairwise average MVP; (5) a zero MV. Other types of candidates and other orderings may also be used.

Video encoder 200 may signal to video decoder 300, in a slice header or an SPS for example, the size of a merge list. The size of the merge list may be restricted to being less than or equal to a maximum allowed size, such as size. For each CU encoder in merge mode, video encoder 200 may signal, using truncated unary binarization for instance, an index that corresponds to a selected candidate. In some implementations, video encoder 200 may encode a first bin of the merge index with context coding and bypass code any other bins, although other signaling techniques may also be used.

As introduced above, video encoder 200 and video decoder 300 may be configured to code blocks of video data using MMVD. Video encoder 200 may, for example, include in the bitstream for a CU, a first flag indicating if the CU is coded in merge mode. For those CUs coded in merge mode, video encoder 200 may also include a second flag indicating if the CU is coded using MMVD. The first flag may, for example, be included in the bitstream after a skip flag indicating if the CU is coded in a skip mode.

For a CU coded in MMVD, video decoder 300 may receive an index identifying a merge candidate that is to be used as a merge basis. As indicated above, for some implementations of MMVD mode, only the first two entries in a merge candidate list may be eligible MMVD candidates, in which case the index may be a one-bit flag identifying one of the first two candidates in the merge list.

After video decoder 300 may receive an index identifying a merge candidate, video decoder 300 may receive additional information for refining the motion information of the candidate identified by the index. The additional information includes, for example, an index to specify motion magnitude and an index for indication of motion direction.

Figure 3:
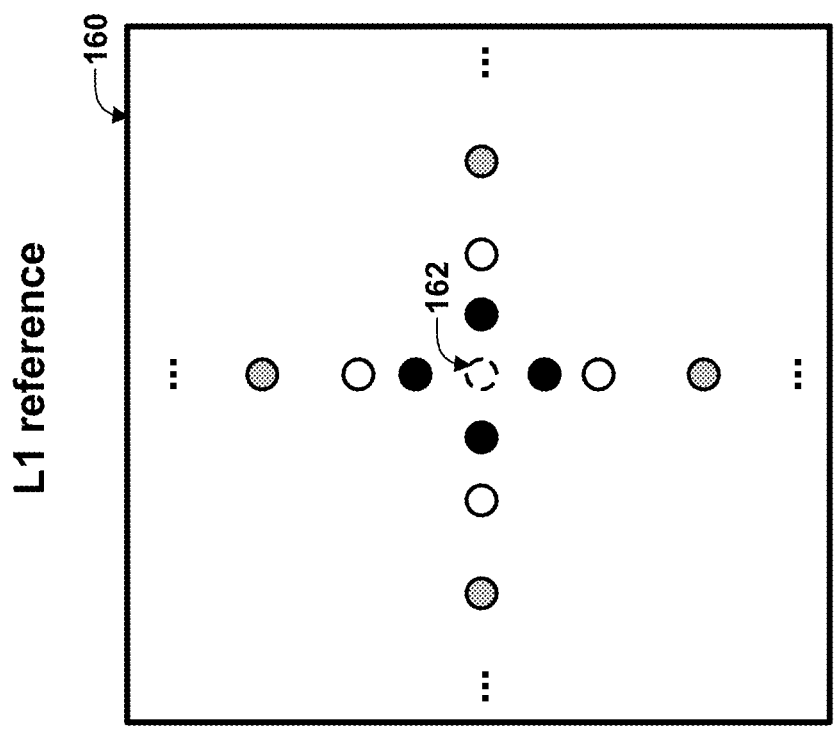
FIG. 3 shows an example of a merge with MVD (MMVD) search point.
Figure 3:
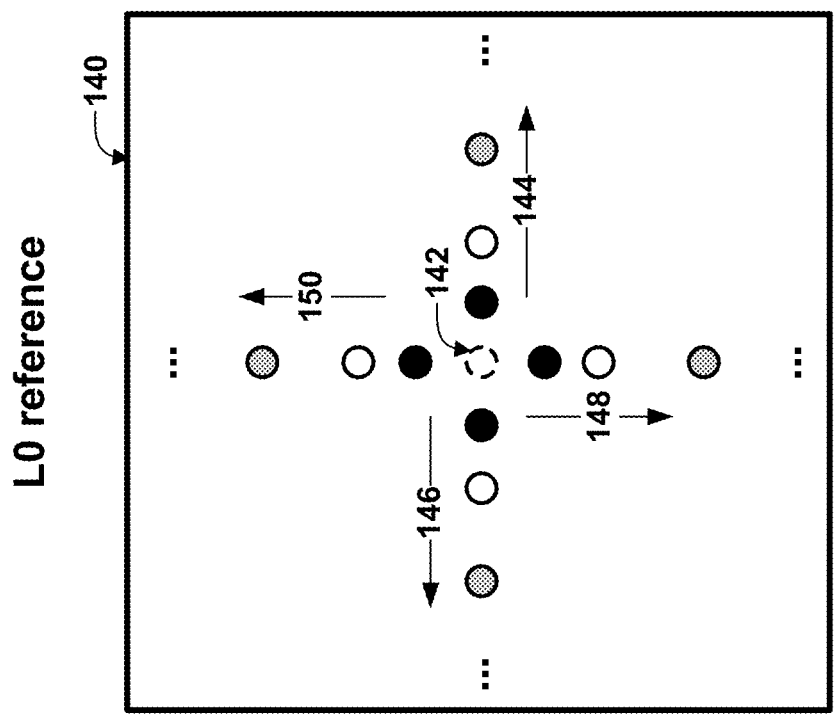

FIG. 3 shows an example of an MMVD search point for two reference pictures, L0 reference picture 140 and L1 reference picture 160. A distance index specifies motion magnitude information and indicates a pre-defined offset from a starting point, such as starting point 142 in reference picture 140 and starting point 162 in reference picture 150. As shown in FIG. 3, an offset is added to either the horizontal component or the vertical component of a starting MV, i.e., the MV of the identified merge candidate. Conceptually, the offset may be either viewed as altering the starting point of the starting MV or altering the MV itself. An example of a relationship between a distance index (IDX) and a pre-defined offset is illustrated in Table 1.

TABLE 1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | 1/4 | 1/2 | 1 | 2 | 4 | 8 | 16 | 32 |

A direction index represents the direction of the MVD relative to a starting point. The direction index can represent one of the four directions shown in Table 2. In FIG. 3, arrow 144 corresponds to direction IDX 00, and arrow 146 corresponds to direction IDX 01. Arrow 148 corresponds to direction IDX 10, and arrow 150 corresponds to direction IDX 11. Other conventions with respect to which axis is the x-axis, which axis is the y-axis, which direction corresponds to positive, and which direction corresponds to negative may also be used.

TABLE 2

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

In some examples, the meaning of the MVD sign may vary according to the information of the starting MVs. For example, when the starting MVs is a uni-prediction MV or bi-prediction MVs where both lists point to the same side of the current picture (i.e., picture order counts (POCs) of two references are both larger than the POC of the current picture, or are both smaller than the POC of the current picture), then the sign in Table 2 may specify the sign of MV offset added to the starting MV. When the starting MVs are bi-prediction MVs with the two MVs pointing to the different sides of the current picture (i.e., the POC of one reference is larger than the POC of the current picture, and the POC of the other reference is smaller than the POC of the current picture), then the sign in Table 2 may specify the sign of MV offset added to the list0 MV component of starting MV and the sign for the list1 MV has opposite value.

In some examples, video encoder 200 and video decoder 300 may be configured to code blocks of video data using affine merge prediction. Video encoder 200 may encode CUs with both width and height larger than or equal to 8 using affine merge mode. In affine merge mode, video encoder 200 and video decoder 300 generate control point motion vectors (CPMVs) for a current CU based on the motion information of spatial neighboring CUs. There can be up to five CPMV predictor (CMPVP) candidates. Video encoder 200 may signal to video decoder 300 an index to indicate the candidate to be used for the current CU. The following three types of CPMV candidates are example of CPMV candidates that may be used to form the affine merge candidate list: (1) inherited affine merge candidates that extrapolated from the CPMVs of the neighbor CUs; (2) constructed affine merge candidates CPMVPs that are derived using the translational MVs of the neighbor CUs; (3) zero MVs.

There may be a maximum of two inherited affine candidates, which video encoder 200 and video decoder 300 may derive from an affine motion model of the neighboring blocks, one from left neighboring CUs and one from above neighboring CUs.

Figure 4:
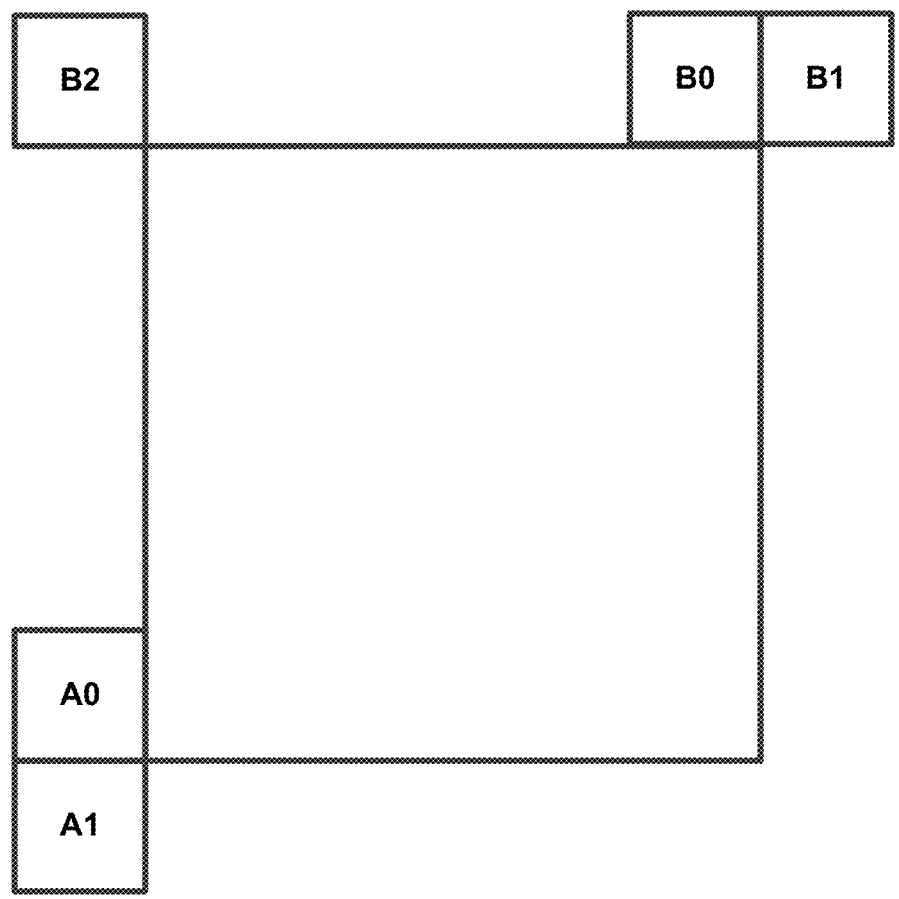
FIG. 4 shows an example of locations of inherited affine motion predictors

FIG. 4 shows an example of locations for inherited affine motion predictors. For the left predictor, the scan order may be A0→A1, and for the above predictor, the scan order may be B0→B1→B2. Video encoder 200 and video decoder 300 may be configured to only include the first inherited candidate from each side in the candidate list. Video encoder 200 and video decoder 300 may be configured to not perform a pruning check for two inherited candidates, meaning that it is possible for duplicate candidates to be included in the list. When a neighboring affine CU is identified, video encoder 200 and video decoder 300 may use the neighboring affine CU's control point motion vectors to derive a CPMVP candidate for inclusion in the affine merge list of the current CU.

Figure 5:
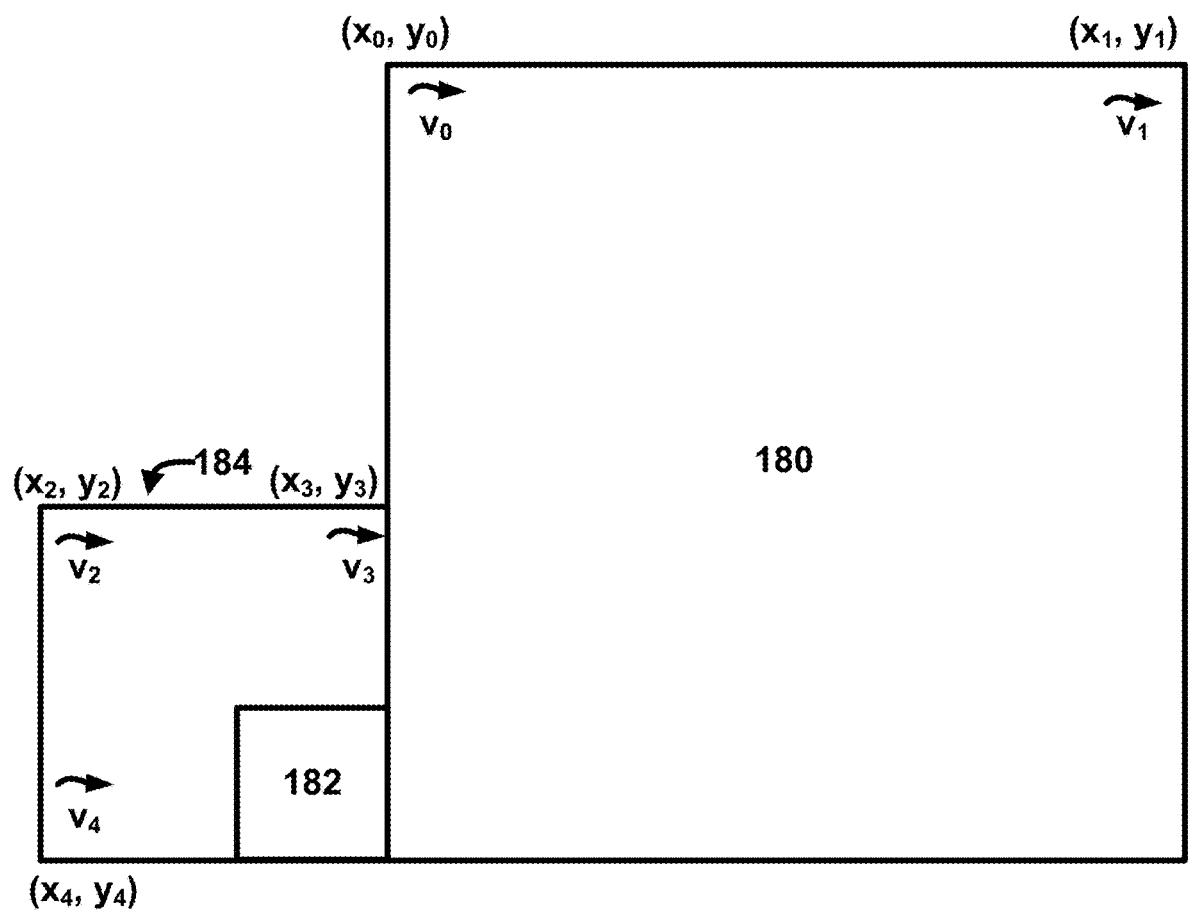
FIG. 5 shows an example of control point motion vector inheritance.

FIG. 5 shows an example of control point motion vector inheritance for current block 180. As shown in FIG. 5, if the neighbor left bottom block 182 is coded in affine mode, then video encoder 200 and video decoder 300 obtain motion vectors $v_2$, $v_3$ and $v_4$ of the top left corner, above right corner and left bottom corner of CU 184, which contains block 182. If block 180 is coded with a 4-parameter affine model, then video encoder 200 and video decoder 300 calculate two CPMVs for current block 180 based on $v_2$, and $v_3$. If block 180 is coded with a 6-parameter affine model, then video encoder 200 and video decoder 300 calculate three CPMVs for current block 180 based on $v_2$, $v_3$ and $v_4$.

Figure 6:
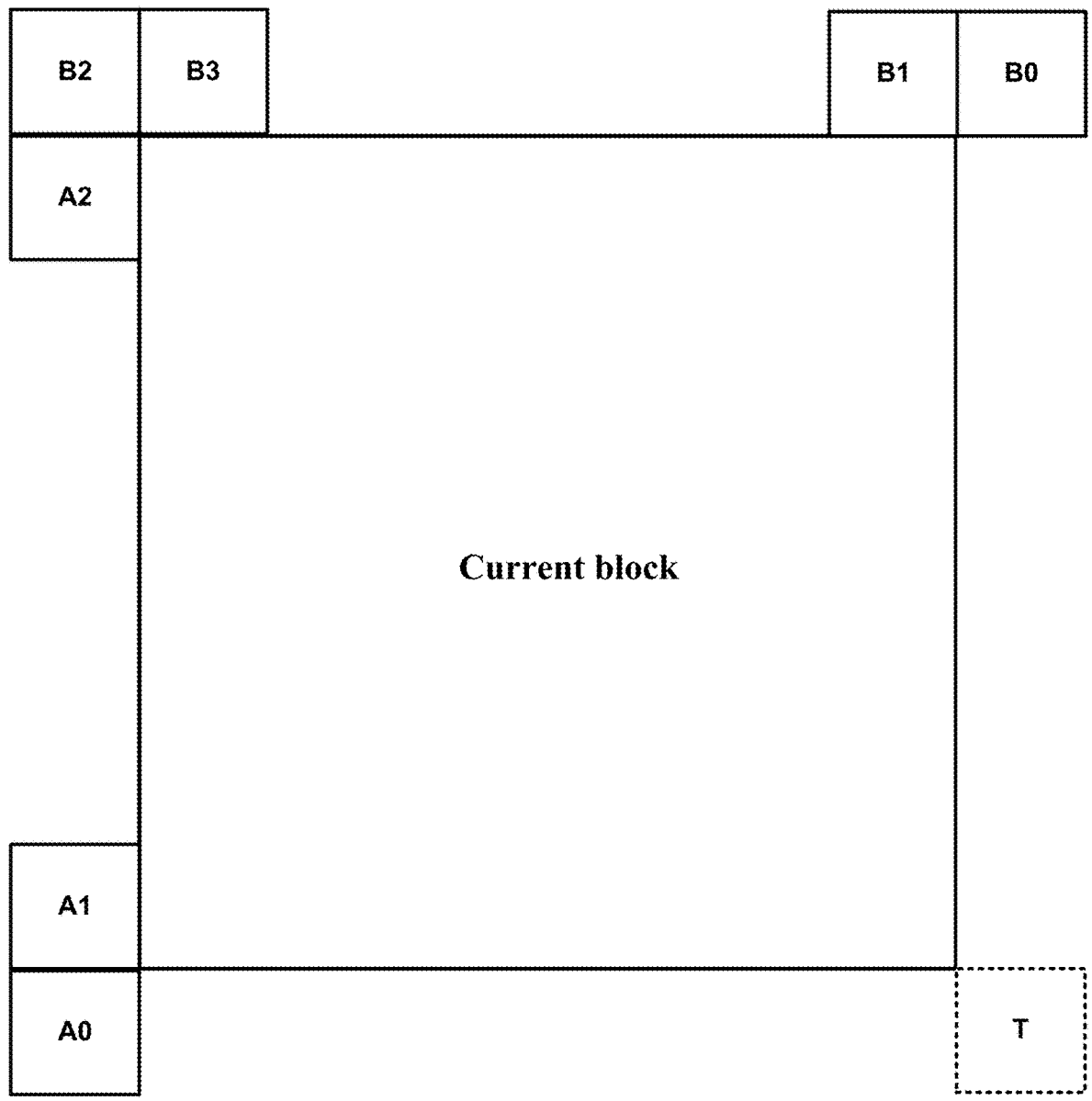
FIG. 6 shows an example of locations of candidates position for constructed affine merge mode.

FIG. 6 shows an example of locations for candidates for construct inclusion in a candidate list for affine merge mode. A constructed affine candidate refers to a candidate that is constructed by combining the neighbor translational motion information of each control point. Video encoder 200 and video decoder 300 may derive the motion information for the control points from the specified spatial neighbors and temporal neighbor shown in FIG. 6.

$CPMV_k$ (k=1, 2, 3, 4) represents the k-th control point. For $CPMV_1$, video encoder 200 and video decoder may check, in order, block B2, block B3, and block A2 and use the MV of the first available block. For $CPMV_2$, video encoder 200 and video decoder may check, in order, block B1 and then block B0 and use the MV of the first available block. For $CPMV_3$, video encoder 200 and video decoder may check, in order, block A1 and then block A0 and use the MV of the first available block. For $CPMV_4$, video encoder 200 and video decoder may check a temporal motion vector predictor (TMVP), and if available, use the TMVP. The TMVP corresponds to a motion vector for a block that it collocated to block T.

After MVs for four control points are obtained, video encoder 200 and video decoder 300 construct affine merge candidates based on the motion information. The following combinations of control point MVs may be used to construct in order, the following candidates:
{$CPMV_1$, $CPMV_2$, $CPMV_3$},
{$CPMV_1$, $CPMV_2$, $CPMV_4$},
{$CPMV_1$, $CPMV_3$, $CPMV_4$},
{$CPMV_2$, $CPMV_3$, $CPMV_4$},
{$CPMV_1$, $CPMV_2$},
{$CPMV_1$, $CPMV_3$}

The combination of 3 CPMVs constructs a 6-parameter affine merge candidate, and the combination of 2 CPMVs constructs a 4-parameter affine merge candidate. To avoid the need for a motion scaling process, video encoder 200 and video decoder 300 may discard the related combination of control point MVs if the reference indices of control points are different.

After checking inherited affine merge candidates and constructed affine merge candidates, if the list is still not full, then video encoder 200 and video decoder 300 may insert zero MVs at the end of the candidate list.

Figure 7:
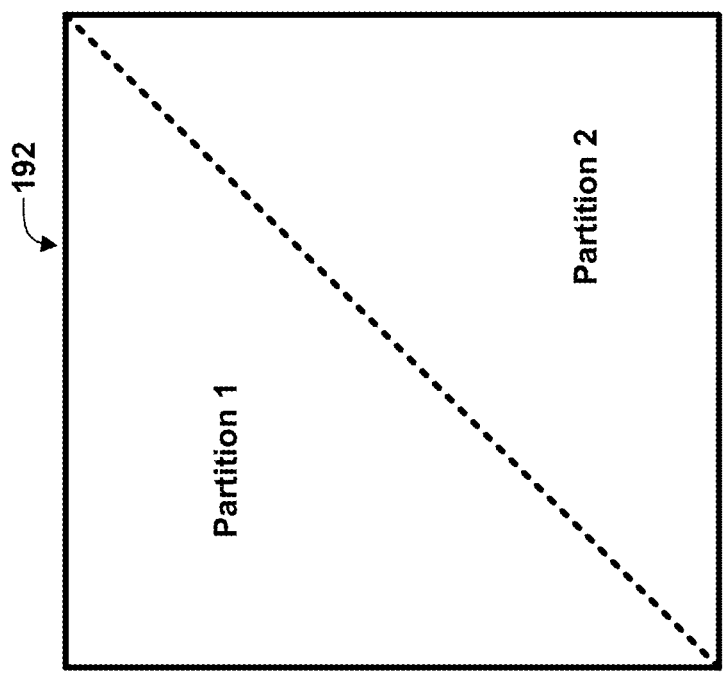
FIG. 7 shows an example of triangle partition based inter prediction.
Figure 7:
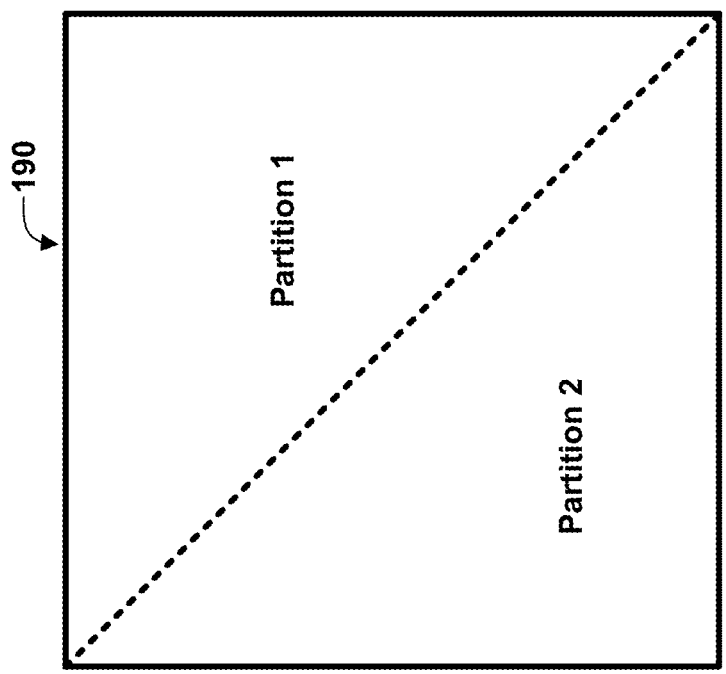

FIG. 7 shows an example of triangle partition (sometimes called geometric partition) based inter prediction for CU 190 and CU 192. Video encoder 200 and video decoder 300 may be configured to code blocks of video data using triangle merge mode. Video encoder 200 and video decoder 300 may be configured to only apply the triangle partition mode to CUs that are 8×8 or larger and are coded in skip or merge mode. For a CU satisfying these conditions, video encoder 200 may signal a CU-level flag to indicate whether or not the triangle partition mode is applied.

When triangle partition based inter prediction is used, a CU is split evenly into two triangle-shaped partitions, using either the diagonal split (for example CU 190 in FIG. 7) or the anti-diagonal split (for example CU 192 in FIG. 7). Each triangle partition in the CU may be separately inter-predicted, meaning each partition may be predicted using unique motion. In some implementations of triangle partition based inter prediction, only uni-prediction is permitted for each partition, meaning each partition has one motion vector and one reference index. The uni-prediction motion constraint may be applied to ensure that, as with conventional bi-prediction, only two motion compensated predictions are needed for each CU. Video encoder 200 and video decoder 300 may derive the uni-prediction motion for each partition from a uni-prediction candidate list constructed using the techniques described above with respect to uni-prediction candidate list construction.

If a CU-level flag indicates that the current CU is coded using the triangle partition mode, then video encoder 200 may additionally signal an index in the range of [0, 39]. Using this triangle partition index, video decoder 300 may determine the direction of the triangle partition (diagonal or anti-diagonal), as well as the motion for each of the partitions through a look-up table. Video encoder 200 and video decoder 300 may apply the transform and quantization processes to the whole CU as in other prediction modes. Video encoder 200 and video decoder 300 may, for example, store the motion field of a CU predicted using the triangle partition mode in 4×4 units.

Figure 8:
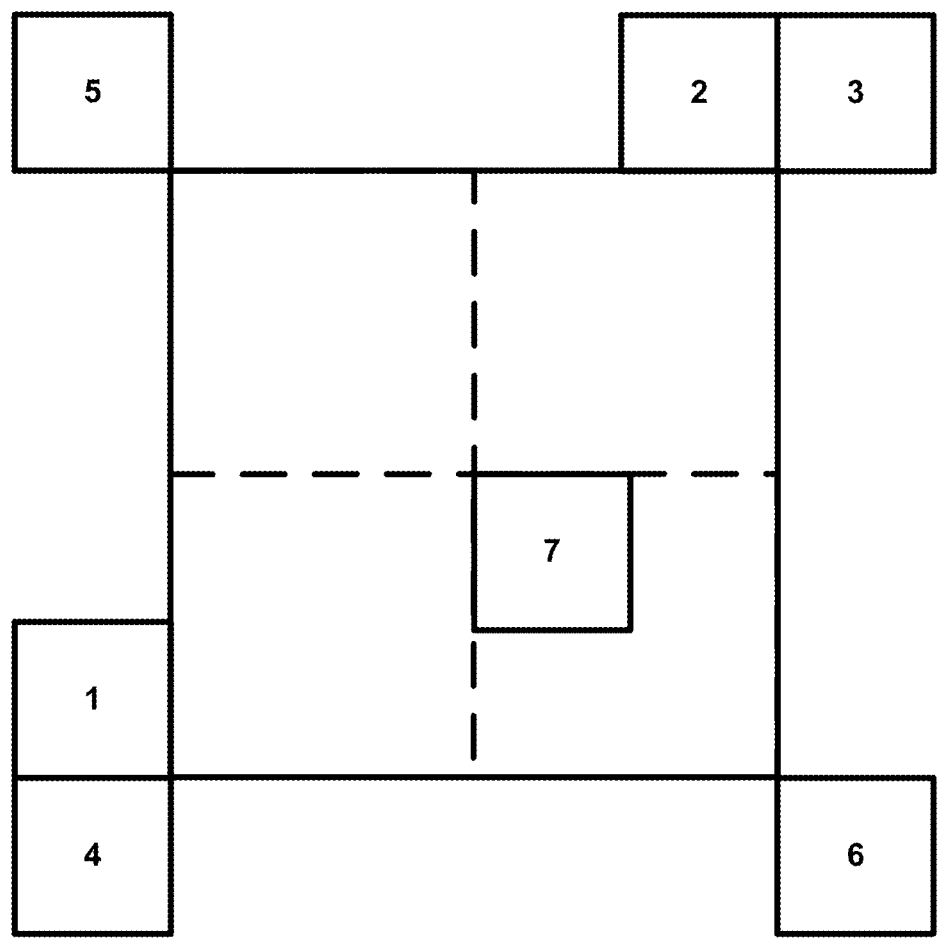
FIG. 8 shows an example of spatial and temporal neighboring blocks used to construct the uni-prediction candidate list.

FIG. 8 shows an example of spatial and temporal neighboring blocks used to construct a uni-prediction candidate list. Video encoder 200 and video decoder 300 may be configured to code blocks of video data using the uni-prediction candidate list construction. The uni-prediction candidate list may, for example include five uni-prediction motion vector candidates. Video encoder 200 and video decoder 300 may derive the five uni-prediction candidates from seven neighboring blocks including five spatial neighboring blocks (labelled 1 to 5 in FIG. 8) and two temporal co-located blocks (labelled 6 and 7 in FIG. 8). Video encoder 200 and video decoder 300 may collect the motion vectors of the seven neighboring blocks and construct the uni-prediction candidate list according to the following order: first, the motion vectors of the uni-predicted neighboring blocks; then, for the bi-predicted neighboring blocks, the L0 motion vectors (that is, the L0 motion vector part of the bi-prediction MV), the L1 motion vectors (that is, the L1 motion vector part of the bi-prediction MV), and averaged motion vectors of the L0 and L1 motion vectors of the bi-prediction MVs. If the number of candidates is still less than five, then video encoder 200 and video decoder 300 may add a zero motion vector to the end of the list.

In other examples, video encoder 200 and video decoder 300 may be configured to code blocks of video data using combined inter and intra prediction (CIIP). When a CU is coded in merge mode, and if the CU contains at least 64 luma samples (that is, CU width times CU height is equal to or larger than 64), video encoder 200 may signal an additional flag to indicate if the CIIP mode is applied to the current CU.

In order to form the CIIP prediction, video encoder 200 and video decoder 300 may derive an intra prediction mode from two additional syntax elements. Up to four possible intra prediction modes can be used: DC, planar, horizontal, or vertical. Then, video encoder 200 and video decoder 300 may derive the inter prediction and intra prediction signals using regular intra and inter decoding processes. Finally, video encoder 200 and video decoder 300 may perform weighted averaging of the inter and intra prediction signals to obtain the CIIP prediction.

In other examples, video encoder 200 and video decoder 300 may be configured to code blocks of video data using intra prediction mode derivation. Up to four intra prediction modes, including DC, PLANAR, HORIZONTAL, and VERTICAL modes, can be used to predict the luma component in the CIIP mode. If the CU shape is very wide (e.g., the width is more than two times the height), then the HORIZONTAL mode may not be allowed. If the CU shape is very narrow (e.g., height is more than two times the width), then the VERTICAL mode may not be allowed. In these coding scenarios, only 3 intra prediction modes may be allowed.

The CIIP mode uses three most probable modes (MPM) for intra prediction. Video encoder 200 and video decoder 300 may construct a CIIP MPM candidate list as follows:

The left and top neighboring blocks are set as A and B, respectively

The intra prediction modes of block A and block B, denoted as intraModeA and intraModeB, respectively, are derived as follows:

Let X be either A or B intraModeX is set to DC if 1) block X is not available; or 2) block X is not predicted using the CIIP mode or the intra mode; 3) block B is outside of the current CTU otherwise, intraModeX is set to 1) DC or PLANAR if the intra prediction mode of block X is DC or PLANAR; or 2) VERTICAL if the intra prediction mode of block X is a "vertical-like" angular mode (larger than 34), or 3) HORIZONTAL if the intra prediction mode of block X is a "horizontal-like" angular mode (smaller than or equal to 34)

If intraModeA and intraModeB are the same:

If intraModeA is PLANAR or DC, then the three MPMs are set to {PLANAR, DC, VERTICAL} in that order Otherwise, the three MPMs are set to {intraModeA, PLANAR, DC} in that order Otherwise (intraModeA and intraModeB are different):

The first two MPMs are set to {intraModeA, intraModeB} in that order

Uniqueness of PLANAR, DC and VERTICAL is checked in that order against the first two MPM candidate modes; as soon as a unique mode is found, it is added to as the third MPM If the CU shape is very wide or very narrow as defined above, then video encoder 200 and video decoder 300 may infer the MPM flag to be 1 without signaling. Otherwise, video encoder 200 signals an MPM flag to indicate if the CIIP intra prediction mode is one of the CIIP MPM candidate modes.

If the MPM flag is 1, then video encoder 200 further signals an MPM index to indicate which one of the MPM candidate modes is used for CIIP intra prediction. Otherwise, if the MPM flag is 0, the intra prediction mode is set to the "missing" mode in the MPM candidate list. For example, if the PLANAR mode is not in the MPM candidate list, then PLANAR is the missing mode, and the intra prediction mode is set to PLANAR. If four possible intra prediction modes are allowed in CIIP, and the MPM candidate list contains only three intra prediction modes, then one of the four possible modes must be the missing mode.

For the chroma components, direct mode, where a chroma component reuses the intra prediction mode used for a corresponding luma component, may always be applied without additional signaling. That is, chroma uses the same prediction mode as luma. The intra prediction mode of a CIIP-coded CU will be saved and used in the intra mode coding of the future neighboring CUs. Video encoder 200 and video decoder 300 may be configured to code blocks of video data by combining the inter and intra prediction signals.

Video decoder 300 derives the inter prediction signal in the CIIP mode $P_{inter}$ using the same inter prediction process applied to regular merge mode; and the intra prediction signal $P_{intra}$ is derived using the CIIP intra prediction mode following the regular intra prediction process. Then, video decoder 300 combines the intra and inter prediction signals using weighted averaging, where the weight value depends on the intra prediction mode and where the sample is located in the coding block, as follows:

- If the intra prediction mode is the DC or planar mode, or if the block width or height is smaller than 4, then equal weights are applied to the intra prediction and the inter prediction signals.
- Otherwise, the weights are determined based on the intra prediction mode (either horizontal mode or vertical mode in this case) and the sample location in the block. Take the horizontal prediction mode, for example (the weights for the vertical mode are derived similarly but in the orthogonal direction). Denote W as the width of the block and H as the height of the block. The coding block is first split into four equal-area parts, each of the dimension (W/4)×H. Starting from the part closest to the intra prediction reference samples and ending at the part farthest away from the intra prediction reference samples, the weight wt for each of the 4 regions is set to 6, 5, 3, and 2, respectively. The final CIIP prediction signal is derived using the following equation:

$$P_{CIIP}=((8*-wt)*P_{inter}+wt*P_{intra}+4)>>3$$

The following tables and sections describe examples of syntax for merge data. The syntax for merge data including extended merge data, MMVD data, Affine merge data, triangle merge data, and CIIP data in VVC Working Draft is shown in Table 3.

TABLE 3

| Syntax for merge data | Descriptor |
|---|---|
| merge_data( x0, y0, cbWidth, cbHeight ) { | |
|   mmvd_flag[ x0 ][ y0 ] | ae(v) |
|   if( mmvd_flag[ x0 ][ y0 ] == 1 ) { | |
|     mmvd_merge_flag[ x0 ][ y0 ] | ae(v) |
|     mmvd_distance_idx[ x0 ][ y0 ] | ae(v) |
|     mmvd_direction_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] == 1 ) { | |
|       if( MaxNumSubblockMergeCand > 1 ) | |
|         merge_subblock_idx[ x0 ][ y0 ] | ae(v) |
|     } else { | |
|       if( sps_ciip_enabled_flag && cu_skip_flag[ x0 ][ y0 ] == 0 && ( cbWidth * cbHeight) >= 64 && cbWidth < 128 && cbHeight < 128 ) { | |
|         ciip_flag[ x0 ][ y0 ] | ae(v) |
|         if( ciip_flag[ x0 ][ y0 ] ) { | |
|           if ( cbWidth <= 2 * cbHeight \|\| cbHeight <= 2 * cbWidth ) | |
|             ciip_luma_mpm_flag[ x0 ][ y0 ] | ae(v) |
|           if( ciip_luma_mpm_flag[ x0 ][ y0 ] ) | |
|             ciip_luma_mpm_idx[ x0 ][ y0 ] | ae(v) |
|         } | |
|       } | |
|       if( sps_triangle_enabled_flag && tile_group_type == B && cbWidth * cbHeight >= 64 ) | |
|         merge_triangle_flag[ x0 ][ y0 ] | ae(v) |
|       if( merge_triangle_flag[ x0 ][ y0 ] ) | |
|         merge_triangle_idx[ x0 ][ y0 ] | ae(v) |
|       else if( MaxNumMergeCand > 1) | |
|         merge_idx[ x0 ][ y0 ] | ae(v) |
|     } | |
|   } | |
| } | |

The merge data semantics are shown as below:

mmvd_flag[x0][y0] equal to 1 specifies that merge mode with motion vector difference is used to generate the inter prediction parameters of the current coding unit. The array indices x0, y0 specify the location (x0, y0) of the top-left luma sample of the considered coding block relative to the top-left luma sample of the picture.

When mmvd_flag[x0][y0] is not present, it is inferred to be equal to 0.

mmvd_merge_flag[x0][y0] specifies whether the first (0) or the second (1) candidate in the merging candidate list is used with the motion vector difference derived from mmvd_distance_idx[x0][y0] and mmvd_direction_idx[x0][y0]. The array indices x0, y0 specify the location (x0, y0) of the top-left luma sample of the considered coding block relative to the top-left luma sample of the picture.

mmvd_distance_idx[x0][y0] specifies the index used to derive MmvdDistance[x0][y0] as specified in Table 4. The array indices x0, y0 specify the location (x0, y0) of the top-left luma sample of the considered coding block relative to the top-left luma sample of the picture.

TABLE 4

Specification of MmvdDistance[x0][y0] based on mmvd_distance_idx[x0][y0].

| mmvd_distance_idx[x0][y0] | MmvdDistance[x0][y0] |
|---|---|
| 0 | 1 |
| 1 | 2 |
| 2 | 4 |
| 3 | 8 |
| 4 | 16 |
| 5 | 32 |
| 6 | 64 |
| 7 | 128 | mmvd_direction_idx[x0][y0] specifies index used to derive MmvdSign[x0][y0] as specified in Table 5. The array indices x0, y0 specify the location (x0, y0) of the top-left luma sample of the considered coding block relative to the top-left luma sample of the picture.

TABLE 5

Specification of MmvdSign[x0][y0] based on mmvd_direction_idx[x0][y0]

| mmvd_direction_idx[x0][y0] | MmvdSign[x0][y0][0] | MmvdSign[x0][y0][1] |
|---|---|---|
| 0 | +1 | 0 |
| 1 | −1 | 0 |
| 2 | 0 | +1 |
| 3 | 0 | −1 |

Both components of the merge plus MVD offset MmvdOffset[x0][y0] are derived as follows:

$MmvdOffset[x0][y0][0]=(MmvdDistance[x0][y0]<<2)*MmvdSign[x0][y0][0]$ $MmvdOffset[x0][y0][1]=(MmvdDistance[x0][y0]<<2)*MmvdSign[x0][y0][1]$ merge_subblockflag[x0][y0] specifies whether the subblock-based inter prediction parameters for the current coding unit are inferred from neighboring blocks. The array indices x0, y0 specify the location (x0, y0) of the top-left luma sample of the considered coding block relative to the top-left luma sample of the picture. When merge_subblock_flag[x0][y0] is not present, it is inferred to be equal to 0.

merge_subblock_idx[x0][y0] specifies the merging candidate index of the subblock-based merging candidate list where x0, y0 specify the location (x0, y0) of the top-left luma sample of the considered coding block relative to the top-left luma sample of the picture.

When merge_subblock_idx[x0][y0] is not present, it is inferred to be equal to 0.

ciip_flag[x0][y0] specifies whether the combined interpicture merge and intra-picture prediction is applied for the current coding unit. The array indices x0, y0 specify the location (x0, y0) of the top-left luma sample of the considered coding block relative to the top-left luma sample of the picture.

When ciip_flag[x0][y0] is not present, it is inferred to be equal to 0.

The syntax elements ciip_luma_mpm_flag[x0][y0], and ciip_luma_mpm_idx[x0][y0] specify the intra prediction mode for luma samples used in combined inter-picture merge and intra-picture prediction. The array indices x0, y0 specify the location (x0, y0) of the top-left luma sample of the considered coding block relative to the top-left luma sample of the picture. The intra prediction mode is derived as follows.

When ciip_luma_mpm_flag[x0][y0] is not present, it is inferred as follows:
  If cbWidth is greater than 2*cbHeight or cbHeight is greater than 2*cbWidth, ciip_luma_mpm_flag[x0][y0] is inferred to be equal to 1.
  Otherwise, ciip_luma_mpm_flag[x0][y0] is inferred to be equal to 0.

merge_triangle_flag[x0][y0] equal to 1 specifies that for the current coding unit, when decoding a B tile group, triangular shape based motion compensation is used to generate the prediction samples of the current coding unit. merge_triangle_flag[x0][y0] equal to 0 specifies that the coding unit is not predicted by triangular shape based motion compensation. When merge_triangle_flag[x0][y0] is not present, it is inferred to be equal to 0.

merge_triangle_idx[x0][y0] specifies the merging candidate index of the triangular shape based motion compensation candidate list where x0, y0 specify the location (x0, y0) of the top-left luma sample of the considered coding block relative to the top-left luma sample of the picture. When merge_triangle_idx[x0][y0] is not present, it is inferred to be equal to 0.

merge_idx[x0][y0] specifies the merging candidate index of the merging candidate list where x0, y0 specify the location (x0, y0) of the top-left luma sample of the considered coding block relative to the top-left luma sample of the picture.

When merge_idx[x0][y0] is not present, it is inferred as follows:
  If mmvd_flag[x0][y0] is equal to 1, merge_idx[x0][y0] is inferred to be equal to mmvd_merge_flag[x0][y0].
  Otherwise (mmvd_flag[x0][y0] is equal to 0), merge_idx[x0][y0] is inferred to be equal to 0.

It is a requirement of bitstream conformance that when the reference picture corresponding to ref_idx_l0[x0][y0] for the current coding unit is the current decoded picture, mmvd_flag[x0][y0], merge_subblock_flag[x0][y0], ciip_flag[x0][y0] and merge_triangle_flag[x0][y0] shall all be equal to 0.

Existing techniques for MMVD exhibit some potential problems. For example, in the syntax design used in early drafts of VVC, the length of a merge candidate list can be allowed to be one. That is, the value of MaxNumMergeCand (i.e., the maximum number of merge candidates) can be set to 1. However, the syntax parameter mmvd_merge_flag[x0][y0] is always parsed to specify whether the first (0) or the second (1) candidate in the merging candidate list is used, even though, when MaxNumMergeCand is equal to 1, there is no second candidate in the merging candidate list. Furthermore, this coding scenario may also result in merge_idx[x0][y0] being in an ambiguous condition in that merge_idx[x0][y0] could be inferred to be 0 if MaxNumMergeCand=1 and mmvd_flag[x0][y0]=0, and conversely merge_idx[x0][y0] could be inferred to be 0 or 1 if MaxNumMergeCand=1 and mmvd_flag[x0][y0]=1.

This disclosure introduces techniques that may address the problems described above. According to techniques of this disclosure, video encoder 200 may be configured to restrict the syntax parameter mmvd_merge_flag[x0][y0] to only be equal to 0 when the length of the merge candidate list is 1. Additionally, video decoder 300 may be configured to infer mmvd_merge_flag[x0][y0] as equal to 0 when the length of the merge candidate list is 1, which may improve coding gain by saving the bits associated with signaling mmvd_merge_flag[x0][y0] in the coding scenarios where MaxNumMergeCand<=1.

The corresponding modification on the syntax and the semantics can be shown in the table below:

|  | Descriptor |
|---|---|
| merge_data( x0, y0, cbWidth, cbHeight ) { | |
|   mmvd_flag[ x0 ][ y0 ] | ae(v) |
|   if( mmvd_flag[ x0 ][ y0 ] = = 1 ) { | |
|     if( MaxNumMergeCand > 1 ) | |
|       mmvd_merge_flag[ x0 ][ y0 ] | ae(v) |
|       mmvd_distance_idx[ x0 ][ y0 ] | ae(v) |
|       mmvd_direction_idx[ x0 ][ y0 ] | ae(v) |
|   } else { | |
|     ... | |
|   } | |
| } | |

The syntax element mmvd_merge_flag[x0][y0] specifies whether the first (0) or the second (1) candidate in the merging candidate list is used with the motion vector difference derived from mmvd_distance_idx[x0][y0] and mmvd_direction_idx[x0][y0]. The array indices x0, y0 specify the location (x0, y0) of the top-left luma sample of the considered coding block relative to the top-left luma sample of the picture.

When mmvd_merge_flag[x0][y0] is not present, it is inferred to be equal to 0.

It is further proposed to decouple the relationship between the syntax parameter mmvd_merge_flag[x0][y0] and merge_idx[x0][y0] by inferring merge_idx[x0][y0] to be equal to 0 when MaxNumMergeCand<=1 or when merge_idx[x0][y0] is not present. As mmvd_merge_flag[x0][y0] and merge_idx[x0][y0] are referring to indexes in different scenarios, the two syntax elements may be able to be combined into a single syntax element.

The corresponding modification on the semantics can be shown in the table below with deletions being identified by <DEL> and </DEL>.

merge_idx[x0][y0] specifies the merging candidate index of the merging candidate list where x0, y0 specify the location (x0, y0) of the top-left luma sample of the considered coding block relative to the top-left luma sample of the picture.

<DEL> When merge_idx[x0][y0] is not present, it is inferred as follows: </DEL>

If mmvd_flag[x0][y0] is equal to 1, merge_idx[x0][y0] is inferred to be equal to mmvd_merge_flag[x0][y0].

<DEL> Otherwise (mmvd_flag[x0][y0] is equal to 0), </DEL> merge_idx[x0][y0] is inferred to be equal to 0.

According to some examples, mmvd_merge_flag[x0][y0] may be combined into merge_idx[x0][y0] by removing mmvd_merge_flag[x0][y0] because both syntax elements indicate the index in the merging candidate list, which reduces a parameter that might be redundant. If MMVD is enabled and MaxNumMergeCand>1, merge_idx[x0][y0] is equal to 0 or 1. If MMVD is disabled and MaxNumMergeCand>1, merge_idx[x0][y0] is equal to 0, 1, 2, 3 or 4. Otherwise, merge_idx[x0][y0] is inferred to be 0.

The corresponding modification on the syntax and the semantics are shown below, with deletions being identified by <DEL> and </DEL>.

|  | Descriptor |
|---|---|
| merge_data( x0, y0, cbWidth, cbHeight ) { | |
|   mmvd_flag[ x0 ][ y0 ] | ae(v) |
|   if( mmvd_flag[ x0 ][ y0 ] = = 1 ) { | |
|     if( MaxNumMergeCand > 1 ) | |
|       merge_idx[ x0 ][ y0 ] | ae(v) |
|       mmvd_distance_idx[ x0 ][ y0 ] | ae(v) |
|       mmvd_direction_idx[ x0 ][ y0 ] | ae(v) |
|   } else { | |
|     ... | |
|   } | |
| } | |

<DEL>mmvd_merge_flag[x0][y0] specifies whether the first (0) or the second (1) candidate in the merging candidate list is used with the motion vector difference derived from mmvd_distance_idx[x0][y0] and mmvd_direction_idx[x0][y0]. The array indices x0, y0 specify the location (x0, y0) of the top-left luma sample of the considered coding block relative to the top-left luma sample of the picture. </DEL> merge_idx[x0][y0] specifies the merging candidate index of the merging candidate list where x0, y0 specify the location (x0, y0) of the top-left luma sample of the considered coding block relative to the top-left luma sample of the picture.

<DEL> When merge_idx[x0][y0] is not present, it is inferred as follows: </DEL>

If mmvd_flag[x0][y0] is equal to 1, merge_idx[x0][y0] is inferred to be equal to mmvd_merge_flag[x0][y0].

<DEL> Otherwise (mmvd_flag[x0][y0] is equal to 0), </DEL> merge_idx[x0][y0] is inferred to be equal to 0.

Figure 9:
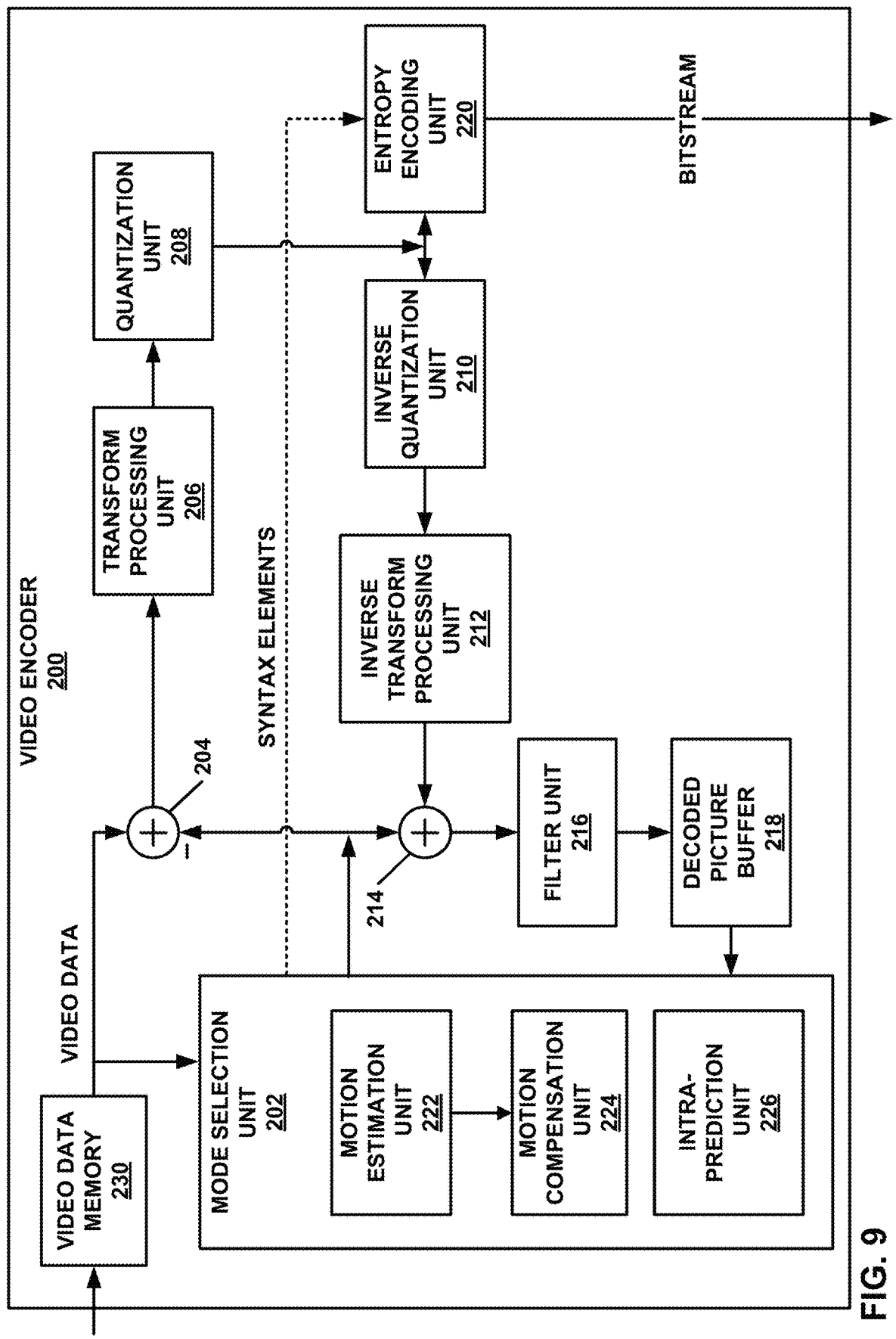
FIG. 9 is a block diagram illustrating an example video encoder that may perform the techniques of this disclosure.

FIG. 9 is a block diagram illustrating an example video encoder 200 that may perform the techniques of this disclosure. FIG. 9 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standard and are applicable generally to video encoding and decoding.

In the example of FIG. 9, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 9 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

Motion estimation unit 222 may, for example, generate one or more merge candidate lists in the manner described above. For a block coded in an MMMVD mode, motion estimation unit 222 may determine motion information for predicting the first bloc and determine motion vector difference information that represents a difference between the motion information for predicting the block and candidate motion information included in an entry of the merge candidate list.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device for encoding video data that includes a memory configured to store video data and one or more processors implemented in circuitry and configured to generate a first merge candidate list for a first block; determine that the first block is coded in a merge mode with motion vector differences; determine first motion information for predicting the first block; determine first motion vector difference information, wherein the first motion vector difference information represents a difference between the first motion information for predicting the first block and candidate motion information included in a first entry of the first merge candidate list; in response to determining that a maximum number of entries for the first merge candidate list is equal to 1, refrain from including, in a bitstream of encoded video data, a flag, wherein a first value for the flag indicates that the first block is to be decoded using a first entry in the first merge candidate list and a second value for the flag indicates that the first block is to be decoded using a second entry in the first merge candidate list; generate, for inclusion in the bitstream of encoded video data, the first motion vector difference information; and output the bitstream of encoded video data.

Figure 10:
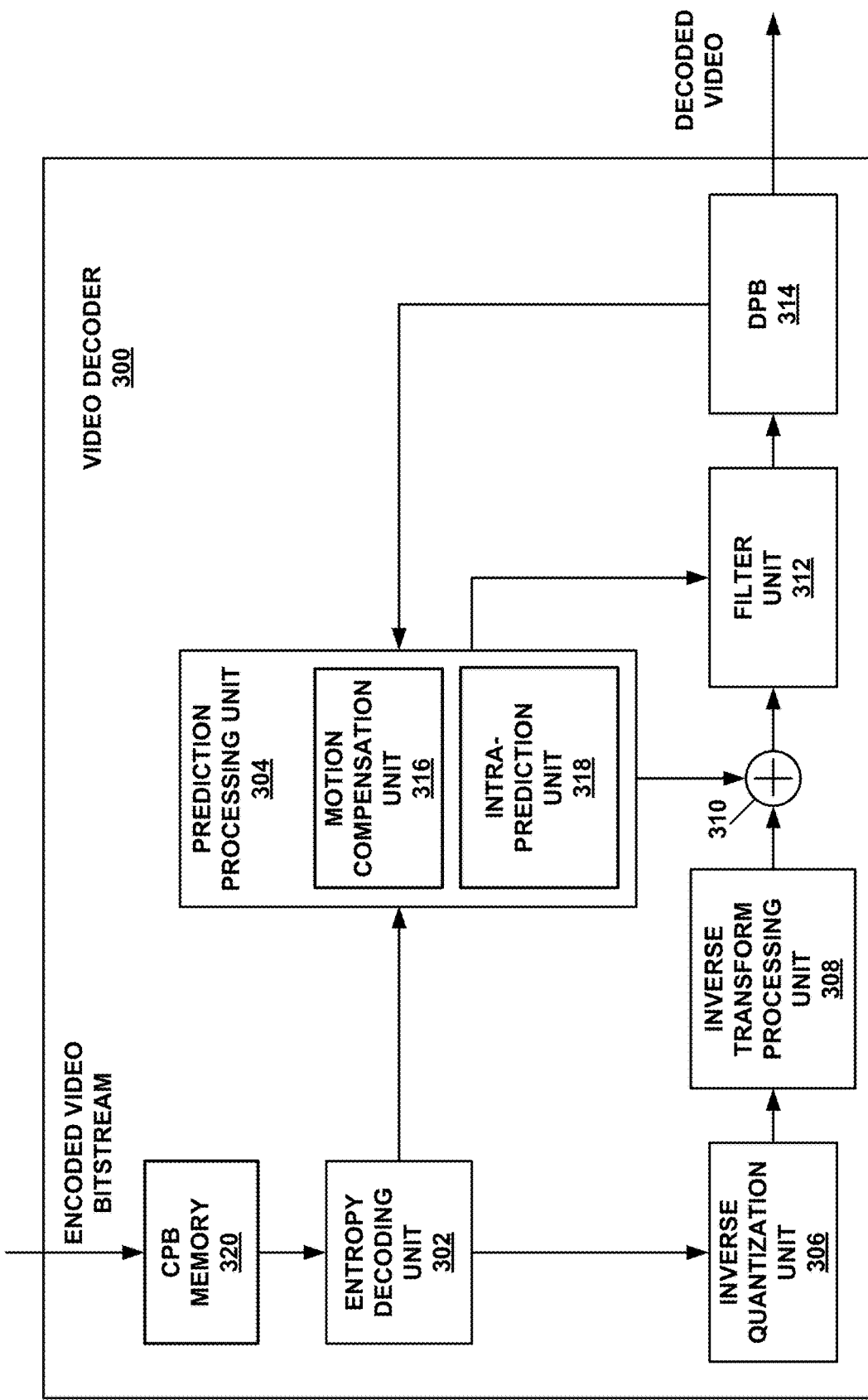
FIG. 10 is a block diagram illustrating an example video decoder that may perform the techniques of this disclosure.

FIG. 10 is a block diagram illustrating an example video decoder 300 that may perform the techniques of this disclosure. FIG. 10 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 10, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 10 are illustrated to assist with understanding the operations performed by video decoder 300. The units may be implemented as fixed-function circuits, programmable circuits, or a combination thereof. Similar to FIG. 9, fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 9).

Motion compensation unit 316 generate candidate lists as described above. For a block coded in an MMMVD mode, for example, motion compensation unit 316 may receive motion vector difference information and determine motion information for predicting the block based on candidate motion information included in an entry of the merge candidate list and the motion vector difference information.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 9). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a device for decoding video data that includes a memory configured to store video data and one or more processors implemented in circuitry and configured to generate a first merge candidate list for a first block; determine that the first block is coded in a merge mode with motion vector differences; in response to determining that a maximum number of entries for the first merge candidate list is equal to 1, infer a value of a first instance of a flag to be equal to a first value, wherein the first value for the flag indicates that the first block is to be decoded using a first entry in the first merge candidate list; receive first motion vector difference information; determine first motion information for predicting the first block based on candidate motion information included in the first entry of the first merge candidate list and the first motion vector difference information; and decode the first block using the first motion information.

Figure 11:
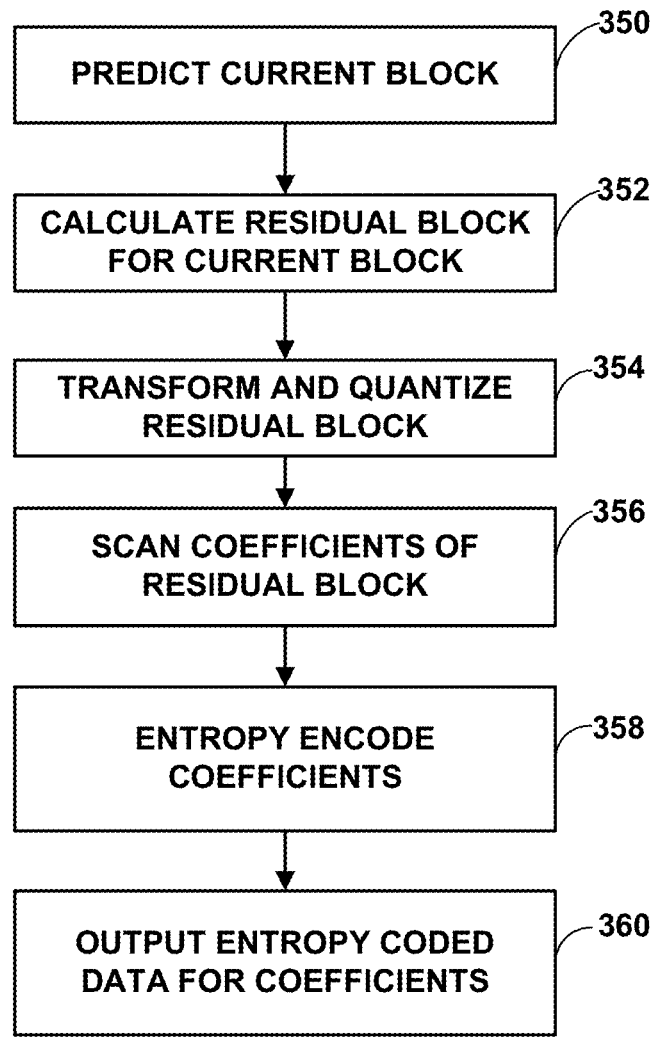
FIG. 11 is a flowchart illustrating a process for encoding video data in accordance with the techniques of this disclosure.

FIG. 11 is a flowchart illustrating an example process for encoding a current block. The current block may include a current CU. Although described with respect to video encoder 200 (FIGS. 1 and 2), it should be understood that other devices may be configured to perform a process similar to that of FIG. 11.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 12:
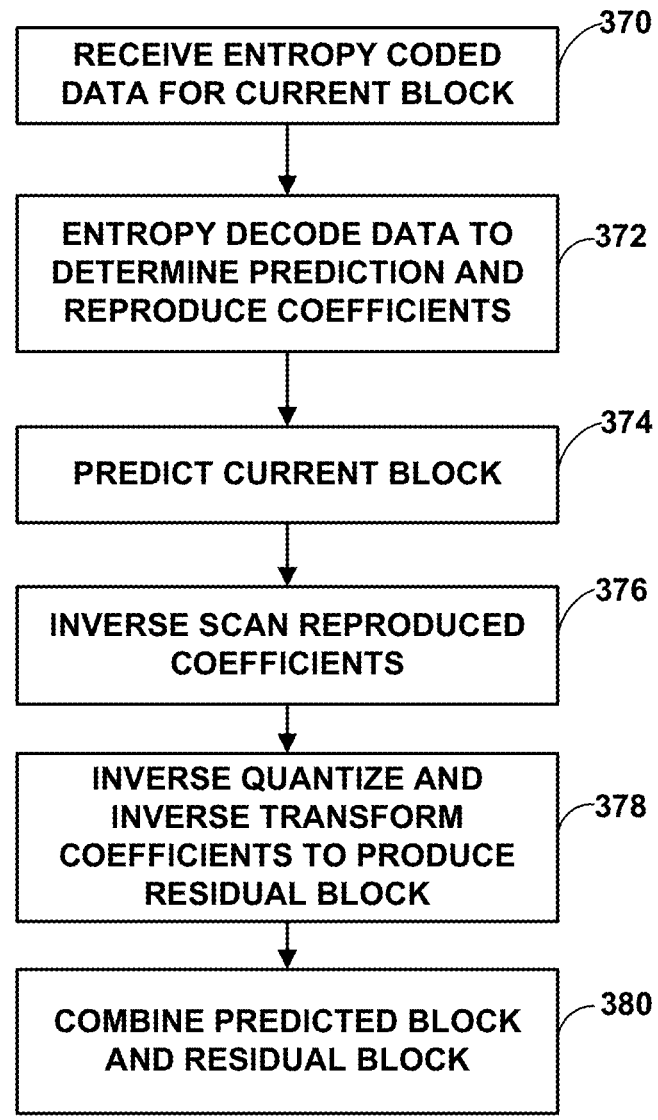
FIG. 12 is a flowchart illustrating a process for decoding video data in accordance with the techniques of this disclosure.

FIG. 12 is a flowchart illustrating an example process for decoding a current block of video data. The current block may include a current CU. Although described with respect to video decoder 300 (FIGS. 1 and 3), it should be understood that other devices may be configured to perform a process similar to that of FIG. 12.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intraor inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 13:
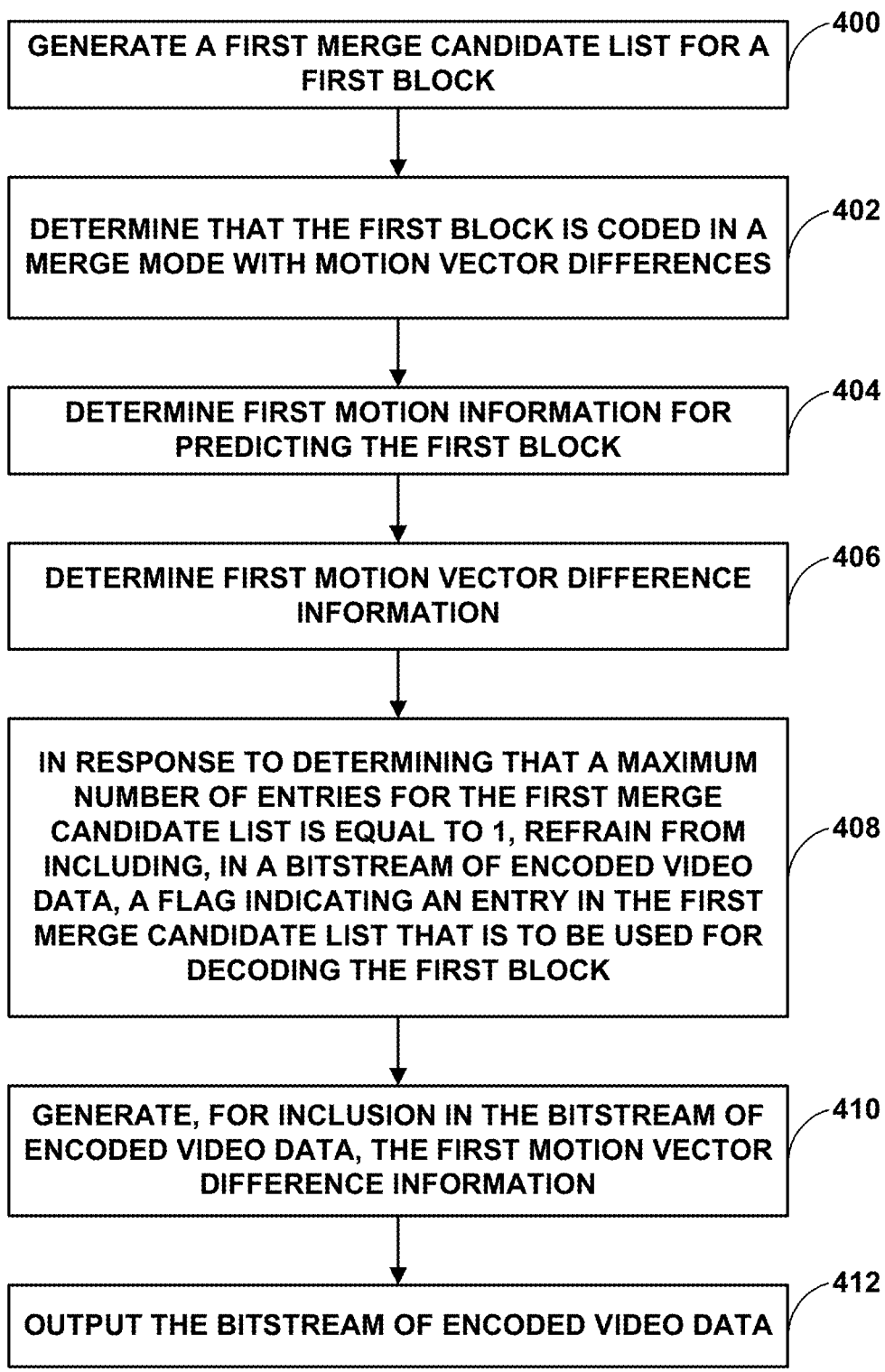
FIG. 13 is a flowchart illustrating a process for encoding video data in accordance with the techniques of this disclosure.

FIG. 13 is a flowchart illustrating an example process for encoding a current block. The current block may include a current CU. Although described with respect to video encoder 200 (FIGS. 1 and 2), it should be understood that other devices may be configured to perform a process similar to that of FIG. 13.

In the example of FIG. 13, video encoder 200 generates a first merge candidate list for a first block (400). Motion estimation unit 222 and/or motion compensation unit 224 may, for example, generate the first merge candidate list using one or a combination of the list construction techniques described above.

Video encoder 200, e.g., motion estimation unit 222, determines that the first block is coded in a merge mode with motion vector differences (402). In conjunction with determining that the first block is coded in a merge mode with motion vector differences, video encoder 200, e.g., entropy encoding unit 220, may also generate, for inclusion in the bitstream of encoded video data, a second syntax element indicating that the first block is coded in the merge mode with motion vector differences. The second syntax element may follow a first syntax element indicating the first block is coded in merge mode. The first and second syntax elements may, for example, be 1-bit flags.

Video encoder 200 determines first motion information for predicting the first block (404). Motion estimation unit 222 may, for example, determine the first motion information as part of a motion estimation process as described above.

Video encoder 200 determines first motion vector difference information (406). Motion estimation unit 222 may, for example, compare the first motion information to the candidates in the first merge candidate list to determine the first motion vector difference information. The first motion vector difference information may, for example, represent a difference between the first motion information for predicting the first block and candidate motion information included in a first entry of the first merge candidate list.

In response to determining that a maximum number of entries for the first merge candidate list is equal to 1, video encoder 200 refrains from including, in a bitstream of encoded video data, a flag (408). A first value for the flag indicates that the first block is to be decoded using a first entry in the first merge candidate list and a second value for the flag indicates that the first block is to be decoded using a second entry in the first merge candidate list. The flag may, for example, be the mmvd_merge_flag discussed above. Video encoder 200 may also generate, for inclusion in the bitstream of encoded video data, an indication of a number of entries for the first merge candidate list. This indication may, for example, be included in a sequence parameter set data structure.

Video encoder 200 generates, for inclusion in the bitstream of encoded video data, the first motion vector difference information (410). The first motion vector difference information may, for example, include a distance index that identifies an offset and a direction index that identifies a direction for the offset, as discussed in more detail above.

The direction index may, for example, be determined form the syntax element mmvd_direction_idx as described above. The offset may, for example, be determined from the syntax element mmvd_distance_idx as described above. Entropy encoding unit 220 may, for example, include instances of the syntax elements mmvd_direction_idx and mmvd_distance_idx in the encoded bitstream.

Video encoder 200 outputs the bitstream of encoded video data (412). For example, video encoder 200 may store the encoded video data in a storage medium or may transmit the encoded video data. To transmit the encoded video data, video encoder 200 may, for example, modulate, according to a wireless communication standard, a signal comprising the encoded video data.

Video encoder 200 may also generate a second merge candidate list for a second block and determine that the second block is coded in the merge mode with motion vector differences. Video encoder 200 may determine second motion information for predicting the second block and determine second motion vector difference information that represents a difference between the second motion information for predicting the second block and candidate motion information included in an entry of the second merge candidate list. In response to determining that a maximum number of entries for the second merge candidate list is greater than 1, video encoder 200 may generate, for inclusion in the bitstream of encoded video data, an instance of the flag. A first value for the flag may indicate that the second block is to be decoded using a first entry in the second merge candidate list, and a second value for the flag indicates that the second block is to be decoded using a second entry in the second merge candidate list. Video encoder 200 may set a value for the instance of the flag to either one or zero depending on which candidate in the second merge candidate list that video encoder 200 selected as the basis for the second motion information. Video encoder 200 may generate, for inclusion in the bitstream of encoded video data, the second motion vector difference information.

Figure 14:
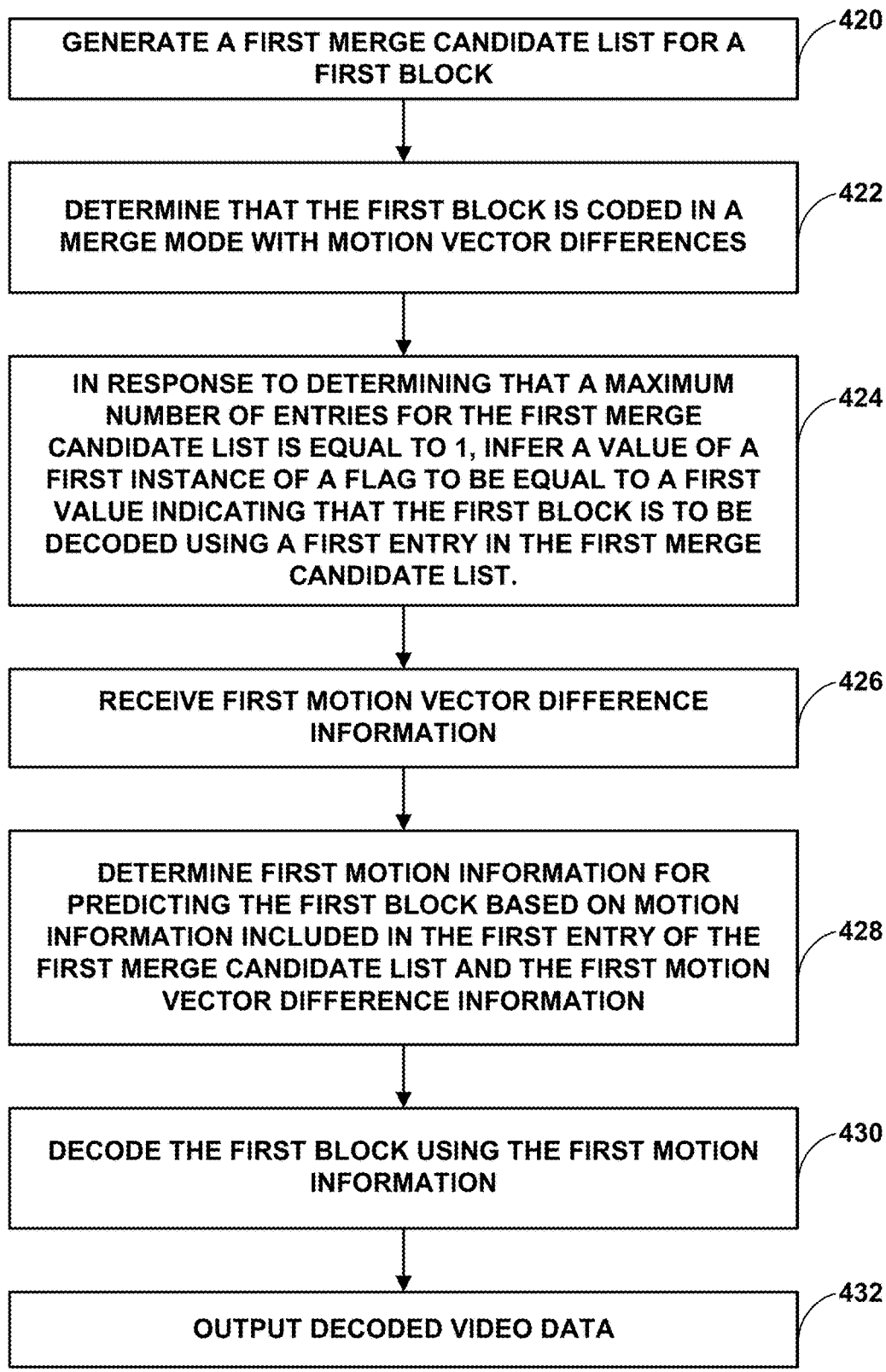
FIG. 14 is a flowchart illustrating a process for decoding video data in accordance with the techniques of this disclosure.

FIG. 14 is a flowchart illustrating an example process for decoding a current block of video data. The current block may include a current CU. Although described with respect to video decoder 300 (FIGS. 1 and 3), it should be understood that other devices may be configured to perform a process similar to that of FIG. 14.

In the example of FIG. 14, video decoder 300 generates a first merge candidate list for a first block (420). Motion compensation unit 316 may, for example, generate the first merge candidate list using one or a combination of the list construction techniques described above.

Video decoder 300 determines that the first block is coded in a merge mode with motion vector differences (422). To determine that the first block is coded in a merge mode with motion vector differences, entropy decoding unit 302 may, for example, receive a first syntax element indicating the first block is coded in merge mode, and in response to determining that the first syntax element indicates the first block is coded in the merge mode, receive a second syntax element indicating that the first block is coded in the merge mode with motion vector differences. The first and second syntax elements may, for example, be 1-bit flags.

In response to determining that a maximum number of entries for the first merge candidate list is equal to 1, video decoder 300 infers a value of a first instance of a flag to be equal to a first value (424). The first value for the flag indicates that the first block is to be decoded using a first entry in the first merge candidate list. The flag may, for example, be the mmvd_merge_flag discussed above. Video decoder 300 may, for example, determine that the number of entries for the first merge candidate list is equal to 1 by receiving an indication of the number of entries for the first merge candidate list in a sequence parameter set.

Video decoder 300 receives first motion vector difference information (426). Video decoder 300 may, for example, receive a distance index that identifies an offset, and receive a direction index that identifies a direction for the offset. The direction index may, for example, be determined form the syntax element mmvd_direction_idx as described above. The offset may, for example, be determined from the syntax element mmvd_distance_idx as described above.

Video decoder 300 determines first motion information for predicting the first block based on candidate motion information included in the first entry of the first merge candidate list and the first motion vector difference information (428). Video decoder 300 determines the first motion information for predicting the first block by modifying a motion vector of the candidate motion information included in the first entry of the first merge candidate list based on the offset and the direction for the offset.

Video decoder 300 decodes the first block using the first motion information (430). Video decoder 300 may, for example, output decoded video (432) that includes the decoded first block to a decoded picture buffer for use in decoding future video data, output the decoded video data for display, or output the decoded video data for storage for later display.

Video decoder 300 may also generate a second merge candidate list for a second block and determine that the second block is coded in the merge mode with motion vector differences. In response to determining that a maximum number of entries for the second merge candidate list is greater than one, video decoder 300 receives, in the video data, a syntax element indicating that a second instance of the flag is equal to the first value. The first value for the flag indicates that the second block is to be decoded using a first entry in the second merge candidate list. Video decoder 300 receives second motion vector difference information and determines second motion information for predicting the second block based on candidate motion information included in the first entry of the second merge candidate list and the second motion vector difference information. Video decoder 300 decoders the second block using the second motion information.

Video decoder 300 may also generate a third merge candidate list for a third block and determine that the third block is coded in the merge mode with motion vector differences. In response to determining that a maximum number of entries for the third merge candidate list is greater than one, video decoder 300 receives, in the video data, a second syntax element indicating that a third instance of the flag is equal to a second value. The second value for the flag indicates that the third block is to be decoded using a second entry in the third merge candidate list. Video decoder 300 receives third motion vector difference information and determines third motion information for predicting the third block based on candidate motion information included in the second entry of the third merge candidate list and the third motion vector difference information. Video decoder 300 decodes the third block using the third motion information.

The following paragraphs are a non-limiting set of examples in accordance with techniques of this disclosure.

Example 1

A method of decoding video data, the method comprising: determining that a first block is coded in a merge mode with motion vector differences; in response to determining that a maximum number of entries for a first merge candidate list is equal to 1, inferring a value of a first instance of a flag to be equal to a first value, wherein the first value for the flag indicates that the first block is to be decoded using a first entry in the first merge candidate list; and decoding the first block using the first entry in the first merge candidate list.

Example 2

The method of example 1, further comprising: determining that a second block is coded in the merge mode with motion vector differences; in response to determining that a maximum number of entries for a second merge candidate list is greater than one, receiving, in the video data, a syntax element indicating that a second instance of the flag is equal to the first value, wherein the first value for the flag indicates that the second block is to be decoded using a first entry in the second merge candidate list; and decoding the second block using the first entry in the second merge candidate list.

Example 3

The method of example 1 or 2, further comprising: determining that a third block is coded in the merge mode with motion vector differences; in response to determining that a maximum number of entries for a third merge candidate list is greater than one, receiving, in the video data, a second syntax element indicating that a third instance of the flag is equal to a second value, wherein the second value for the flag indicates that the third block is to be decoded using a second entry in the third merge candidate list; and decoding the third block using the first entry in the second merge candidate list.

Example 4

The method of any of examples 1-3, wherein determining that the first block is coded in the merge mode with motion vector differences comprises: receiving a first syntax element indicating the first block is coded in merge mode; in response to determining that the first syntax element indicates the first block is coded in the merge mode, receiving a flag indicating that the first block is coded in the merge mode with motion vector differences.

Example 5

The method of any of examples 1-4, wherein decoding the first block using the first entry in the first merge candidate list comprises: receiving motion vector difference information; based on motion information of the first merge candidate and the motion vector difference information, determining motion information for decoding the first block.

Example 6

The method of any of examples 1-5, wherein determining that the number of entries for the first merge candidate list is equal to 1 comprises receiving an indication of the number of entries for the first merge candidate list in a sequence parameter set.

Example 7

A device for decoding video data, the device comprising one or more means for performing the method of any of examples 1-6.

Example 8

The device of example 7, wherein the one or more means comprise one or more processors implemented in circuitry.

Example 9

The device of any of examples 7 and 8, further comprising a memory to store the video data.

Example 10

The device of any of examples 7-9, further comprising a display configured to display decoded video data.

Example 11

The device of any of examples 7-10, wherein the device comprises one or more of a camera, a computer, a mobile device, a broadcast receiver device, or a set-top box.

Example 12

The device of any of examples 7-11, wherein the device comprises a video decoder.

Example 13

The device of any of examples 7-12, wherein the device comprises a video encoder.

Example 14

A computer-readable storage medium having stored thereon instructions that, when executed, cause one or more processors to perform the method of any of examples 1-6.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    generating a first merge candidate list for a first block;
    determining that the first block is coded in a merge mode with motion vector differences;
    in response to determining that a maximum number of entries for the first merge candidate list is equal to 1, determining, without the receipt of explicit signaling, a value of a first instance of a flag to be equal to a first value, wherein the first value for the flag indicates that the first block is to be decoded using a first entry in the first merge candidate list;
    receiving first motion vector difference information;
    determining first motion information for predicting the first block based on candidate motion information included in the first entry of the first merge candidate list and the first motion vector difference information;

decoding the first block using the first motion information;
generating a second merge candidate list for a second block;
determining that the second block is coded in the merge mode with motion vector differences;
in response to determining that a maximum number of entries for the second merge candidate list is greater than 1, receiving, in the video data, a second instance of the flag, wherein the second instance of the flag is set equal to the first value, wherein the first value for the second instance of the flag indicates that the second block is to be decoded using a first entry in the second merge candidate list;
receiving second motion vector difference information;
determining second motion information for predicting the second block based on candidate motion information included in the first entry of the second merge candidate list and the second motion vector difference information;
decoding the second block using the second motion information;
generating a third merge candidate list for the third block;
determining that the third block is coded in the merge mode with motion vector differences;
in response to determining that a maximum number of entries for the third merge candidate list is greater than 1, receiving, in the video data, a third instance of the flag, wherein the third instance of the flag is equal to a second value, wherein the second value for the flag indicates that the third block is to be decoded using a second entry in the third merge candidate list;
receiving third motion vector difference information;
determining third motion information for predicting the third block based on candidate motion information included in the second entry of the third merge candidate list and the third motion vector difference information; and
decoding the third block using the third motion information.

2. The method of claim 1, wherein determining that the first block is coded in the merge mode with motion vector differences comprises:
receiving a first syntax element indicating the first block is coded in merge mode;
in response to determining that the first syntax element indicates the first block is coded in the merge mode, receiving a second syntax element indicating that the first block is coded in the merge mode with motion vector differences.

3. The method of claim 1, wherein determining that the number of entries for the first merge candidate list is equal to 1 comprises receiving an indication of the number of entries for the first merge candidate list in a sequence parameter set.

4. The method of claim 1, wherein:
receiving the first motion vector difference information comprises receiving a distance index that identifies an offset, and
determining the first motion information for predicting the first block based on the candidate motion information included in the first entry of the first merge candidate list and the first motion vector difference information comprises modifying a motion vector of the candidate motion information included in the first entry of the first merge candidate list based on the offset.

5. The method of claim 4, wherein:
receiving the first motion vector difference information further comprises receiving a direction index that identifies a direction for the offset, and
determining the first motion information for predicting the first block based on the candidate motion information included in the first entry of the first merge candidate list and the first motion vector difference information further comprises modifying a motion vector of the candidate motion information included in the first entry of the first merge candidate list based on the direction for the offset.

6. A device for decoding video data, the device comprising:
a memory configured to store video data; and
one or more processors implemented in circuitry and configured to:
generate a first merge candidate list for a first block;
determine that the first block is coded in a merge mode with motion vector differences;
in response to a determination that a maximum number of entries for the first merge candidate list is equal to 1, determine, without the receipt of explicit signaling, a value of a first instance of a flag to be equal to a first value, wherein the first value for the flag indicates that the first block is to be decoded using a first entry in the first merge candidate list;
receive first motion vector difference information;
determine first motion information for predicting the first block based on candidate motion information included in the first entry of the first merge candidate list and the first motion vector difference information; and
decode the first block using the first motion information;
generate a second merge candidate list for a second block;
determine that the second block is coded in the merge mode with motion vector differences;
in response to a determination that a maximum number of entries for the second merge candidate list is greater than 1, receive, in the video data, a second instance of the flag, wherein the second instance of the flag is equal to the first value, wherein the first value for the second instance of the flag indicates that the second block is to be decoded using a first entry in the second merge candidate list; and
receive second motion vector difference information;
determine second motion information for predicting the second block based on candidate motion information included in the first entry of the second merge candidate list and the second motion vector difference information;
decode the second block using the second motion information;
generate a third merge candidate list for the third block;
determine that the third block is coded in the merge mode with motion vector differences;
in response to a determination that a maximum number of entries for the third merge candidate list is greater than 1, receive, in the video data, a third instance of the flag, wherein the third instance of the flag is equal to a second value, wherein the second value for the third instance of the flag indicates that the third block is to be decoded using a second entry in the third merge candidate list;
receive third motion vector difference information;
determine third motion information for predicting the third block based on candidate motion information included in the second entry of the third merge candidate list and the third motion vector difference information; and decode the third block using the third motion information.

7. The device of claim 6, wherein to determine that the first block is coded in the merge mode with motion vector differences, the one or more processors are configured to:
receive a first syntax element indicating the first block is coded in merge mode;
in response to determining that the first syntax element indicates the first block is coded in the merge mode, receive a second syntax element indicating that the first block is coded in the merge mode with motion vector differences.

8. The device of claim 6, wherein to determine that the number of entries for the first merge candidate list is equal to 1, the one or more processors are configured to receive an indication of the number of entries for the first merge candidate list in a sequence parameter set.

9. The device of claim 6, wherein to receive the first motion vector difference information, the one or more processors are configured to receive a distance index that identifies an offset, and wherein to determine the first motion information for predicting the first block based on the candidate motion information included in the first entry of the first merge candidate list and the first motion vector difference information, the one or more processors are configured to modify a motion vector of the candidate motion information included in the first entry of the first merge candidate list based on the offset.

10. The device of claim 9, wherein to receive the first motion vector difference information, the one or more processors are configured to receive a direction index that identifies a direction for the offset, and wherein to determine the first motion information for predicting the first block based on the candidate motion information included in the first entry of the first merge candidate list and the first motion vector difference information, the one or more processors are configured to modify a motion vector of the candidate motion information included in the first entry of the first merge candidate list based on the direction for the offset.

11. The device of claim 10, wherein the device comprises a wireless communication device, further comprising a receiver configured to receive encoded video data.

12. The device of claim 11, wherein the wireless communication device comprises a telephone handset and wherein the receiver is configured to demodulate, according to a wireless communication standard, a signal comprising the encoded video data.

13. The device of claim 10, further comprising:
a display configured to display decoded video data.

14. The device of claim 10, wherein the device comprises one or more of a camera, a computer, a mobile device, a broadcast receiver device, or a set-top box.

15. An apparatus for decoding video data, the apparatus comprising:
means for generating a first merge candidate list for a first block;
means for determining that the first block is coded in a merge mode with motion vector differences;
means for determining, without the receipt of explicit signaling, a value of a first instance of a flag to be equal to a first value in response to determining that a maximum number of entries for the first merge candidate list is equal to 1, wherein the first value for the flag indicates that the first block is to be decoded using a first entry in the first merge candidate list;
means for receiving first motion vector difference information;
means for determining first motion information for predicting the first block based on candidate motion information included in the first entry of the first merge candidate list and the first motion vector difference information;
means for decoding the first block using the first motion information;
means for generating a second merge candidate list for a second block;
means for determining that the second block is coded in the merge mode with motion vector differences;
means for receiving, in the video data, a second instance of the flag in response to determining that a maximum number of entries for the second merge candidate list is greater than 1, wherein the second instance of the flag is set equal to the first value, wherein the first value for the second instance of the flag indicates that the second block is to be decoded using a first entry in the second merge candidate list; and
means for receiving second motion vector difference information;
means for determining second motion information for predicting the second block based on candidate motion information included in the first entry of the second merge candidate list and the second motion vector difference information;
means for decoding the second block using the second motion information;
means for generating a third merge candidate list for the third block;
means for determining that the third block is coded in the merge mode with motion vector differences;
means for receiving, in the video data, a third instance of the flag in response to determining that a maximum number of entries for the third merge candidate list is greater than 1, wherein the third instance of the flag is equal to a second value, wherein the second value for the flag indicates that the third block is to be decoded using a second entry in the third merge candidate list;
means for receiving third motion vector difference information;
means for determining third motion information for predicting the third block based on candidate motion information included in the second entry of the third merge candidate list and the third motion vector difference information; and
means for decoding the third block using the third motion information.

16. The apparatus of claim 15, wherein the means for determining that the first block is coded in the merge mode with motion vector differences comprises:
means for receiving a first syntax element indicating the first block is coded in merge mode;
means for receiving a second syntax element indicating that the first block is coded in the merge mode with motion vector differences in response to determining that the first syntax element indicates the first block is coded in the merge mode.

17. The apparatus of claim 15, wherein the means for determining that the number of entries for the first merge candidate list is equal to 1 comprises means for receiving an indication of the number of entries for the first merge candidate list in a sequence parameter set.

18. The apparatus of claim 15, wherein:
the means for receiving the first motion vector difference information comprises means for receiving a distance index that identifies an offset, and
the means for determining the first motion information for predicting the first block based on the candidate motion information included in the first entry of the first merge candidate list and the first motion vector difference information comprises means for modifying a motion vector of the candidate motion information included in the first entry of the first merge candidate list based on the offset.

19. The apparatus of claim 18, wherein:
the means for receiving the first motion vector difference information further comprises means for receiving a direction index that identifies a direction for the offset, and
the means for determining the first motion information for predicting the first block based on the candidate motion information included in the first entry of the first merge candidate list and the first motion vector difference information further comprises means for modifying a motion vector of the candidate motion information included in the first entry of the first merge candidate list based on the direction for the offset.

20. A device for encoding video data, the device comprising:
a memory configured to store video data; and
one or more processors implemented in circuitry and configured to:
generate a first merge candidate list for a first block;
determine that the first block is coded in a merge mode with motion vector differences;
determine first motion information for predicting the first block;
determine first motion vector difference information, wherein the first motion vector difference information represents a difference between the first motion information for predicting the first block and candidate motion information included in a first entry of the first merge candidate list;
in response to a determination that a maximum number of entries for the first merge candidate list is equal to 1, not including, in a bitstream of encoded video data, a first instance of a flag, wherein a first value for the first instance of the flag indicates that the first block is to be decoded using a first entry in the first merge candidate list and a second value for the first instance flag indicates that the first block is to be decoded using a second entry in the first merge candidate list;
generate, for inclusion in the bitstream of encoded video data, the first motion vector difference information;
generate a second merge candidate list for a second block;
determine that the second block is coded in the merge mode with motion vector differences;
determine second motion information for predicting the second block;
determine second motion vector difference information, wherein the second motion vector difference information represents a difference between the second motion information for predicting the second block and candidate motion information included in an entry of the second merge candidate list;
in response to a determination that a maximum number of entries for the second merge candidate list is greater than 1, generate, for inclusion in the bitstream of encoded video data, a second instance of the flag having a first value, wherein the first value for the second instance of the flag indicates that the second block is to be decoded using a first entry in the second merge candidate list and a second value for the second instance of the flag indicates that the second block is to be decoded using a second entry in the second merge candidate list;
generate, for inclusion in the bitstream of encoded video data, the second motion vector difference information;
generate a third merge candidate list for a third block;
determine that the third block is coded in the merge mode with motion vector differences;
determine third motion information for predicting the third block;
determine third motion vector difference information, wherein the third motion vector difference information represents a difference between the third motion information for predicting the third block and candidate motion information included in an entry of the third merge candidate list;
in response to a determination that a maximum number of entries for the third merge candidate list is greater than 1, generate, for inclusion in the bitstream of encoded video data, a third instance of the flag having a second value, wherein a first value for the third instance of the flag indicates that the third block is to be decoded using a first entry in the third merge candidate list and a second value for the third instance of the flag indicates that the third block is to be decoded using a second entry in the third merge candidate list;
generate, for inclusion in the bitstream of encoded video data, the third motion vector difference information; and
output the bitstream of encoded video data.

21. The device of claim 20, wherein the one or more processors implemented in circuitry are further configured to:
generate, for inclusion in the bitstream of encoded video data, a first syntax element indicating the first block is coded in merge mode;
generate, for inclusion in the bitstream of encoded video data, a second syntax element indicating that the first block is coded in the merge mode with motion vector differences.

22. The device of claim 20, wherein the one or more processors implemented in circuitry are further configured to:
generate, for inclusion in a sequence parameter set data structure in the bitstream of encoded video data, an indication of a number of entries for the first merge candidate list.

23. The device of claim 20, wherein the first motion vector difference information comprises a distance index that identifies an offset.

24. The device of claim 23, wherein the first motion vector difference information comprises a direction index that identifies a direction for the offset.

25. The device of claim 20, wherein the device comprises a wireless communication device, further comprising a transmitter configured to transmit encoded video data.

26. The device of claim 25, wherein the wireless communication device comprises a telephone handset and wherein the transmitter is configured to modulate, according to a wireless communication standard, a signal comprising the encoded video data.

27. The device of claim 20, further comprising:
a camera configured to capture the video data.

28. The device of claim 20, wherein the device comprises one or more of a camera, a computer, or a mobile device.

29. A non-transitory computer-readable storage medium storing instructions that when executed by one or more processors cause the one or more processors to:
generate a first merge candidate list for a first block;
determine that the first block is coded in a merge mode with motion vector differences;
in response to a determination that a maximum number of entries for the first merge candidate list is equal to 1, determine, without the receipt of explicit signaling, a value of a first instance of a flag to be equal to a first value, wherein the first value for the flag indicates that the first block is to be decoded using a first entry in the first merge candidate list;
receive first motion vector difference information;
determine first motion information for predicting the first block based on candidate motion information included in the first entry of the first merge candidate list and the first motion vector difference information;
decode the first block using the first motion information;
generate a second merge candidate list for a second block;
determine that the second block is coded in the merge mode with motion vector differences;
in response to a determination that a maximum number of entries for the second merge candidate list is greater than 1, receive, in the video data, a second instance of the flag, wherein the second instance of the flag is set equal to the first value, wherein the first value for the second instance of the flag indicates that the second block is to be decoded using a first entry in the second merge candidate list; and
receive second motion vector difference information;
determine second motion information for predicting the second block based on candidate motion information included in the first entry of the second merge candidate list and the second motion vector difference information;
decode the second block using the second motion information;
generate a third merge candidate list for the third block;
determine that the third block is coded in the merge mode with motion vector differences;
in response to a determination that a maximum number of entries for the third merge candidate list is greater than 1, receive, in the video data, a third instance of the flag, wherein the third instance of the flag is equal to a second value, wherein the second value for the flag indicates that the third block is to be decoded using a second entry in the third merge candidate list;
receive third motion vector difference information;
determine third motion information for predicting the third block based on candidate motion information included in the second entry of the third merge candidate list and the third motion vector difference information; and
decode the third block using the third motion information.

30. The non-transitory computer-readable storage medium of claim 29, wherein to determine that the first block is coded in the merge mode with motion vector differences, the instructions cause the one or more processors to:
receive a first syntax element indicating the first block is coded in merge mode;
in response to determining that the first syntax element indicates the first block is coded in the merge mode, receive a second syntax element indicating that the first block is coded in the merge mode with motion vector differences.

31. The non-transitory computer-readable storage medium of claim 29, wherein to determine that the number of entries for the first merge candidate list is equal to 1, the instructions cause the one or more processors to comprises receive an indication of the number of entries for the first merge candidate list in a sequence parameter set.

32. The non-transitory computer-readable storage medium of claim 29, wherein:
to receive the first motion vector difference information, the instructions cause the one or more processors to receive a distance index that identifies an offset, and
to determine the first motion information for predicting the first block based on the candidate motion information included in the first entry of the first merge candidate list and the first motion vector difference information, the instructions cause the one or more processors to modify a motion vector of the candidate motion information included in the first entry of the first merge candidate list based on the offset.

33. The non-transitory computer-readable storage medium of claim 32, wherein:
to receive the first motion vector difference information further, the instructions cause the one or more processors
to receive a direction index that identifies a direction for the offset, and
to determine the first motion information for predicting the first block based on the candidate motion information included in the first entry of the first merge candidate list and the first motion vector difference information further, the instructions cause the one or more processors to modify a motion vector of the candidate motion information included in the first entry of the first merge candidate list based on the direction for the offset.

* * * * *